United States Patent
Sung et al.

(10) Patent No.: US 10,545,337 B2
(45) Date of Patent: Jan. 28, 2020

(54) SEE-THROUGH HOLOGRAPHIC DISPLAY APPARATUS

(71) Applicant: SAMSUNG ELECTRONICS CO., LTD., Suwon-si (KR)

(72) Inventors: Geeyoung Sung, Daegu (KR); Yuntae Kim, Suwon-si (KR); Jungkwuen An, Cheonan-si (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 217 days.

(21) Appl. No.: 15/337,548

(22) Filed: Oct. 28, 2016

(65) Prior Publication Data

US 2017/0123204 A1    May 4, 2017

(30) Foreign Application Priority Data

Oct. 28, 2015 (KR) .................. 10-2015-0150272
May 4, 2016 (KR) .................. 10-2016-0055766

(51) Int. Cl.
    G02B 27/01    (2006.01)
    G02B 3/14     (2006.01)
    G03H 1/22     (2006.01)

(52) U.S. Cl.
    CPC .......... *G02B 27/0103* (2013.01); *G02B 3/14* (2013.01); *G02B 27/0172* (2013.01); *G03H 1/2205* (2013.01); *G03H 1/2294* (2013.01); *G02B 2027/0174* (2013.01); *G02B 2027/0178* (2013.01); *G03H 2001/221* (2013.01); *G03H 2001/2207* (2013.01); *G03H 2223/20* (2013.01);

(Continued)

(58) Field of Classification Search
    CPC .. G02B 27/0103; G02B 3/14; G02B 27/0172; G02B 2027/0134; G02B 2027/0174; G02B 2027/0178; G03H 1/2205; G03H 1/2294; G03H 2001/2207; G03H 2001/221; G03H 2001/2284; G03H 2223/20; G03H 2223/50; G03H 2225/36
    USPC .......................................................... 359/9
    See application file for complete search history.

(56) References Cited

U.S. PATENT DOCUMENTS

| 8,547,615 B2    | 10/2013 | Leister |
| 2010/0097671 A1 | 4/2010  | Leister |

(Continued)

FOREIGN PATENT DOCUMENTS

| JP | 2012-159681 A   | 8/2012 |
| KR | 10-2014-0076881 A | 6/2014 |
| WO | 2014151877 A1   | 9/2014 |

OTHER PUBLICATIONS

Thorlabs, "Thorlabs", V21 catalog, p. 948-p. 953. (Year: 2013).*

(Continued)

*Primary Examiner* — Wen Huang
(74) *Attorney, Agent, or Firm* — Sughrue Mion, PLLC

(57) ABSTRACT

A see-through holographic display apparatus includes a relay optical system expanding or reducing and transferring a hologram image generated by a spatial light modulator, a noise removal filter removing noise from diffraction light of the hologram image transferred through the relay optical system, and a light path converter changing at least one of a path of the diffraction light of the hologram image transferred from the relay optical system and a path of external light.

28 Claims, 16 Drawing Sheets

(52) U.S. Cl.
CPC ..... *G03H 2223/50* (2013.01); *G03H 2225/36* (2013.01)

(56) References Cited

U.S. PATENT DOCUMENTS

2012/0188619 A1    7/2012  Song et al.
2013/0222384 A1    8/2013  Futterer

OTHER PUBLICATIONS

A. Schwerdtner, et al; "32.3 A New Approach to Electro-Holography for TV and Projection Displays"; SID 07 Digest; 2007; pp. 1224-1227.
Communication dated Feb. 27, 2017 issued by the European Patent Office in counterpart European Patent Application No. 16196067.9.

* cited by examiner ic # SEE-THROUGH HOLOGRAPHIC DISPLAY APPARATUS

CROSS-REFERENCE TO RELATED APPLICATIONS

This application claims priority from Korean Patent Application No. 10-2015-0150272, filed on Oct. 28, 2015 and Korean Patent Application No. 10-2016-0055766, filed on May 4, 2016, in the Korean Intellectual Property Office, the disclosures of which are incorporated herein in their entireties by reference.

BACKGROUND

1. Field

Apparatuses and methods consistent with exemplary embodiments relate to a holographic display apparatus, and more particularly to a see-through holographic display apparatus via which a hologram image and the outside view are simultaneously or selectively seen.

2. Description of the Related Art

As many three-dimensional (3D) movies have emerged, research into technology relating to 3D image display apparatuses has been carried out. For example, research into apparatuses for implementing a high quality hologram in real time by using a spatial light modulator has been actively conducted.

Further, a great deal of research into a head mounted display (HMD) for implementing a virtual reality (VR) and related products has been recently initiated. However, the related art HMD for VR is based on the stereoscopy technology, which causes visual fatigue due to a vergence-accommodation conflict. The related art HMD for VR may also cause problems when applied to spatial interaction technology.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

One or more exemplary embodiments provide a display apparatus capable of implementing a see-through hologram 3D image.

One or more exemplary embodiments provide a personal see-through 3D display HMD.

According to an aspect of an exemplary embodiment, there is provided a see-through holographic display apparatus including a light source providing light; a spatial light modulator diffracting the light and reproducing a hologram image; a relay optical system expanding or reducing and transferring the hologram image generated by the spatial light modulator; a noise removal filter removing noise from diffraction light of the hologram image transferred through the relay optical system; and a light path converter changing at least one of a path of the diffraction light of the hologram image transferred from the relay optical system and a path of external light and transferring the diffraction light and the external light to the same region.

The see-through holographic display apparatus may further include: a collimator converting the light provided by the light source into collimated light.

The spatial light modulator may include an amplitude spatial light modulator, a phase spatial light modulator, or a complex spatial light modulator.

The relay optical system may include a first optical element on which the hologram image modulated by the spatial light modulator is incident and a second optical element having a second focus of an incident surface side near a first focus of an emission surface side of the first optical element. The first optical element may have a first focal distance, and the second optical element has a second focal distance different from the first focal distance. The noise removal filter may be provided near the first focus of the emission surface side of the first optical element. The noise removal filter may include a pin hole.

The see-through holographic display apparatus may further include: a field optical element focusing the hologram image transferred from the relay optical system.

The field optical element may be provided near an image plane on which the hologram image transferred from the relay optical system is imaged. Alternatively, the field optical element may be arranged such that the image plane on which the hologram image transferred from the relay optical system is imaged is located between a focus location of an incident surface side of the field optical element and an incident surface of the field optical element. The field optical element may be arranged such that the image plane on which the hologram image transferred from the relay optical system is imaged is reimaged as an erect virtual image.

The field optical element may be provided adjacent to the light path converter. A size of the hologram image transferred from the relay optical system may be adjusted by changing a distance between the relay optical system and the field optical element.

The light path converter may include a beam splitter including a first surface on which the diffraction light of the hologram image transferred from the relay optical system is incident, a second surface on which the external light is incident, a third surface opposite to the second surface, and a beam separation film provided inside, reflecting at least a part of the diffraction light of the hologram image transmitted through the first surface to the third surface, and transmitting at least a part of the external light transmitted through the second surface to the third surface, and the field optical element include a field lens provided adjacent to the first surface of the light path converter.

The light path converter may include a beam splitter including a first surface on which the diffraction light of the hologram image transferred from the relay optical system is incident, a second surface on which the external light is incident, a third surface opposite to the second surface, a fourth surface opposite to the first surface, and a beam separation film provided inside, reflecting at least a part of the diffraction light of the hologram image transmitted through the first surface to the fourth surface, reflecting at least a part of the diffraction light of the hologram image transmitted through the fourth surface again to the third surface, and transmitting at least a part of the external light transmitted through the second surface to the third surface, and the field optical element includes a concave reflection mirror provided adjacent to the fourth surface of the light path converter.

The light path converter may include a half mirror, and the field optical element is between the relay optical system and the light path converter and adjacent to the light path converter.

The light path converter may include a beam splitter including a first surface on which the diffraction light of the hologram image transferred from the relay optical system is incident, a second surface on which the external light is incident, a third surface opposite to the second surface, and a beam separation film provided inside, reflecting at least a part of the diffraction light of the hologram image transmitted through the first surface to the third surface, and transmitting at least a part of the external light transmitted through the second surface to the third surface, and wherein the beam separation film has a concave curved surface shape with respect to the first surface to reflect and focus the hologram image transferred from the relay optical system to the third surface.

The beam separation film may be a polarization selective reflection film.

The light path converter may be arranged such that the beam separation film is provided near an image plane on which the hologram image transferred from the relay optical system is imaged.

The see-through holographic display apparatus may further include a light beam selective optical element focusing diffraction light and transmitting external light therethrough. The light beam selective optical element may be a cemented lens of an isotropic lens and an anisotropic lens, and wherein refractive power of the cemented lens with respect to the diffraction light has a positive (+) value and total refractive power of the cemented lens with respect to the external light has zero. The light beam selective optical element may include first and second transparent substrate layers that are opposite to each other and liquid crystal layer interposed between the first and second transparent substrate layers and selectively has a polarization characteristic by controlling the liquid crystal layer by electrodes provided on at least one surface of the first and second transparent substrate layers. The light beam selective optical element may include first and second transparent substrate layers that are opposite to each other and a liquid crystal layer interposed between the first and second transparent substrate layers and is an active liquid lens selectively having refractive power by controlling the liquid crystal layer by electrodes provided on at least one surface of the first and second transparent substrate layers.

The light path converter may include an active reflector regulating a transmission amount of the external light. The active reflector may include one of a liquid crystal filter and an electro-chromic device.

The light path converter may be provided near the pupils of a user.

The see-through holographic display apparatus may be installed in a head mounted housing worn on a head of a viewer for at least one of a left eye and a right eye.

According to an aspect of an exemplary embodiment, there is provided an HMD apparatus displaying a hologram image including a left eye see-through holographic display apparatus; a right eye see-through holographic display apparatus; and a frame connecting the left eye see-through holographic display apparatus and the right eye see-through holographic display apparatus together, wherein each of the left eye see-through holographic display apparatus and the right eye see-through holographic display apparatus includes: a light source providing light; a spatial light modulator diffracting the light and reproducing a hologram image; a relay optical system expanding or reducing and transferring the hologram image generated by the spatial light modulator; a noise removal filter removing noise from diffraction light of the hologram image transferred through the relay optical system; and a light path converter changing at least one of a path of the diffraction light of the hologram image transferred from the relay optical system and a path of external light and transferring the diffraction light and the external light to the same region.

When the HMD apparatus is worn on the head of a user, a light path converter of the left eye see-through holographic display apparatus may be provided adjacent to a left eye of the user and a light path converter of the right eye see-through holographic display apparatus is provided adjacent to a right eye of the user.

A distance between the light path converter of the left eye see-through holographic display apparatus and the light path converter of the right eye see-through holographic display apparatus may be adjusted.

BRIEF DESCRIPTION OF THE DRAWINGS

The above and/or other aspects will become more apparent by describing certain exemplary embodiments, with reference to the accompanying drawings, in which.

DETAILED DESCRIPTION

Figure 1:
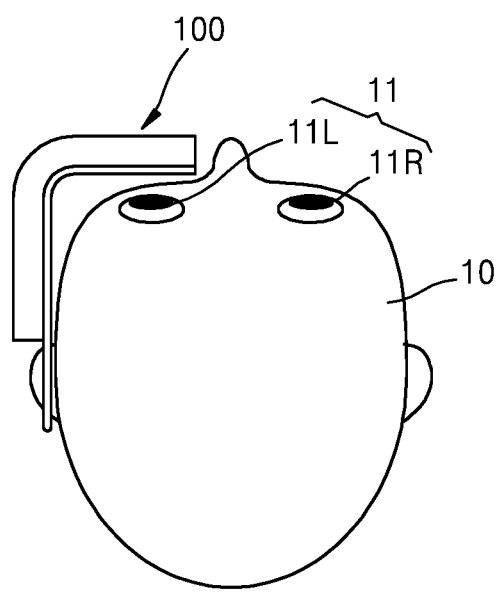
FIG. 1 is a schematic diagram of an example of a see-through holographic display apparatus worn by a user, according to an exemplary embodiment.

Certain exemplary embodiments are described in greater detail below with reference to the accompanying drawings.

In the following description, the same drawing reference numerals are used for the same elements even in different drawings. The matters defined in the description, such as detailed construction and elements, are provided to assist in a comprehensive understanding of exemplary embodiments. Thus, it is apparent that exemplary embodiments can be carried out without those specifically defined matters. Also, well-known functions or constructions are not described in detail since they would obscure exemplary embodiments with unnecessary detail.

Figure 2:
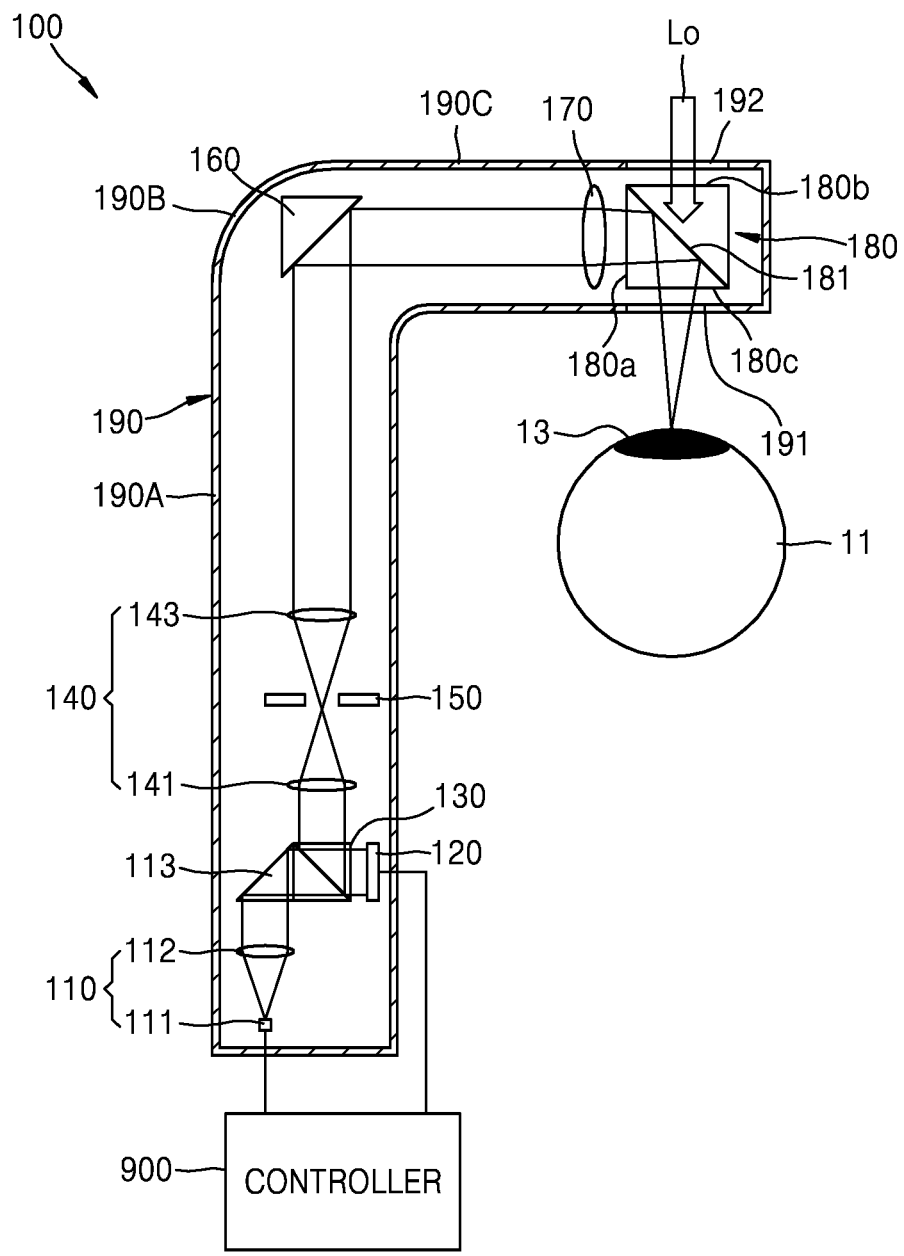
FIG. 2 is a schematic diagram of an optical system of the see-through holographic display apparatus of FIG. 1.

FIG. 1 is a schematic diagram of an example of a see-through holographic display apparatus 100 worn by a user 10, i.e., a viewer, according to an exemplary embodiment. FIG. 2 is a schematic diagram of a relay optical system 140 of the see-through holographic display apparatus 100 of FIG. 1.

Referring to FIG. 1, the see-through holographic display apparatus 100 according to an exemplary embodiment may be a wearable apparatus, such as glasses, worn on the head of the user 10 having eyes 11. For example, the see-through holographic display apparatus 100 may have a shape of one-eye glasses via which a hologram image and the outside are seen by one eye (e.g., a left eye 11L as shown in FIG. 1) of the user 10. As another example, the see-through holographic display apparatus 100 may have a shape attached to one of the eye lenses of glasses.

The see-through holographic display apparatus 100 may include a housing 190 and an optical system installed in the housing 190.

Referring to FIG. 2, the see-through holographic display apparatus 100 of the present exemplary embodiment may include a light source unit 110 providing light, a spatial light modulator 120 forming a hologram image, the relay optical system 140 expanding or reducing and transferring the hologram image generated by the spatial light modulator 120, and a light path converter 180 changing at least one of a path of diffraction light of the hologram image transferred from the relay optical system 140 and a path of external light Lo and transferring the diffraction light of the hologram image and the external light Lo to the same region. The see-through holographic display apparatus 100 may further include a noise removal filter 150 removing noise from the diffraction light of the hologram image transferred from the relay optical system 140. The see-through holographic display apparatus 100 may further include a field optical element including a field lens 170 collimating the hologram image transferred from the relay optical system 140. The see-through holographic display apparatus 100 may further include the controller 900, e.g., a processor or a microprocessor, controlling the spatial light modulator 120 to generate the hologram image and controlling the optical system to transfer and reproduce the hologram image. The controller 900 may be provided outside or inside the housing 190.

The light source unit 110 may include a light source 111. The light source 111 may include a laser diode (LD) to provide light having a high spatial coherence to the spatial light modulator 120. As another example, the light source 111 may include a light-emitting diode (LED) or any other appropriate light source which emits light having a certain degree of spatial coherence, since the light may be sufficiently diffracted and modulated by the spatial light modulator 120. The light source 111 may be configured as an array of red, green, and blue (RGB) light sources, as described below, to implement a color hologram image by RGB time-division driving. For example, the light source 111 may include an array of a plurality of lasers or LEDs.

The light source unit 110 may illuminate collimated parallel light. For example, a collimator lens 112 may be further provided in the light source unit 110 to collimate the light emitted from the light source 111 into parallel light.

The spatial light modulator 120 may form a hologram pattern on a modulating surface thereof according to a hologram data signal provided by the controller 900. Light incident on the spatial light modulator 120 may become diffraction light that is modulated into an image of a hologram wavefront by the hologram pattern. The diffraction light having the image of the hologram wavefront on the spatial light modulator 120, as described below, may enable the hologram image to be seen by diffraction interference in a viewing window (VW), i.e., a viewing location, through the relay optical system 140 and the field lens 170.

The spatial light modulator 120 may include an amplitude spatial light modulator that only performs amplitude modulation, thereby preventing deterioration of resolution and, when a 2D image is formed, preventing deterioration of the quality of the 2D image. For example, the spatial light modulator 120 may include a digital micromirror device (DMD), a liquid crystal on silicon (LCoS), or a semiconductor light modulator. A complex spatial light modulator that modulates both a phase and amplitude or a phase spatial light modulator that modulates the phase may also be used as the spatial light modulator 120.

A light brancher 130 that branches incident light and emission light may be between the light source 111 and the spatial light modulator 120. The incident light and the emission light may respectively be a light incident on and a light emitted from the spatial light modulator 120. The light brancher 130 may allow the light incident from the light source 111 to pass through and travel to the spatial light modulator 120 and may be a beam splitter that reflects light emitted from the spatial light modulator 120 to the relay optical system 140. As another example, the light brancher 130 may be a half mirror.

The light emitted by the light source unit 110 may have polarization. The light source 111 may emit polarized light, or the light source unit 110 may include a polarization filter to polarize the light emitted from the light source 111. In this case, the light brancher 130 may be a polarization beam splitter. A polarization converting member such as a ¼ polarization plate may be further provided between the light brancher 130 and the spatial light modulator 120 to differentiate polarization of the light that goes from the light brancher 130 to the spatial light modulator 120 and polarization of the light reflected from the spatial light modulator 120, thereby more efficiently branching the incident light and the emission light.

A reflection member 113 may be between the light source 111 and the light brancher 130. The reflection member 113 may be a total reflection prism or a mirror. The reflection member 113 may be provided for an appropriate layout of optical members such as the light source 111, etc. in a limited space of the housing 190.

The relay optical system 140 may be a modified 4f optical system that expands or reduces and transfers the image of the hologram wavefront generated by the spatial light modulator 120.

Figure 3:
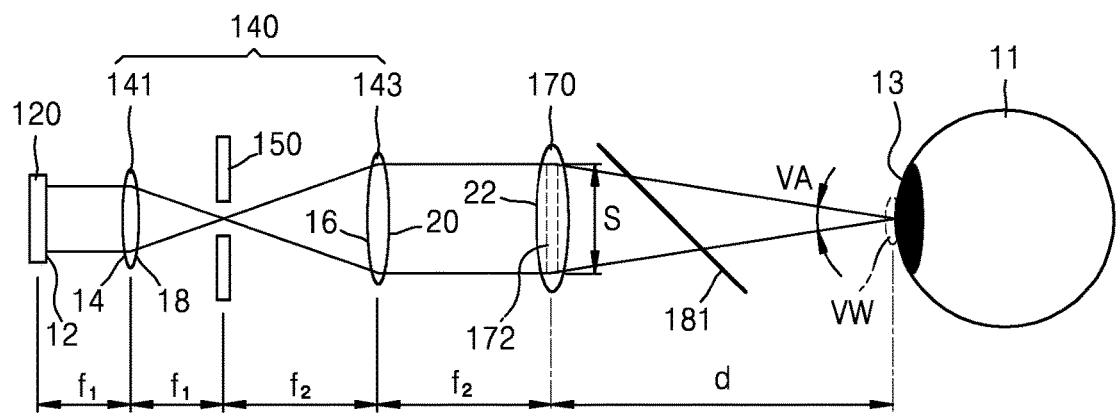
FIG. 3 is a diagram of an example of a layout of a field lens.

With further reference to FIG. 3, as an example, the relay optical system 140 may include a first relay lens 141, e.g., a first optical element, having a first focal distance f1 and a second relay lens 143, e.g., a second optical element, having a second focal distance f2. The first relay lens 141 may be provided such that the modulating surface 12 of the spatial light modulator 120 is positioned at a location of the first focal distance f1 on a side of an incident surface 14 of the first relay lens 141 or near the location of the first focal distance f1 on the side of the incident surface 14. The second relay lens 143 may be provided such that the second focal distance f2 on a side of an incident surface 16 of the second relay lens 143 is positioned at a location of the first focal distance f1 on a side of an emission surface 18 of the first relay lens 141 or near the location of first focal distance f1 on the side of the emission surface 18. According to an optical layout of the relay optical system 140, the image of the hologram wavefront generated on the modulating surface of the spatial light modulator 120 may be imaged at the second focal distance f2 on a side of an emission surface 20 of the second relay lens 143. The image of the hologram wavefront imaged by the relay optical system 140 is referred to as an imaged spatial light modulation (SLM) 172.

The first focal distance f1 may be different from the second focal distance f2. For example, the second focal distance f2 may be larger than the first focal distance f1, thereby the relay optical system 140 may expand the imaged SLM 172. Alternatively, the first focal distance f1 may be larger than the second focal distance f2, thereby the relay optical system 140 may reduce the imaged SLM 172. As described below, since a size of the imaged SLM 172 is in proportion to a viewing angle (VA), the VA may be changed by expanding or reducing the imaged SLM 172.

The noise removal filter 150 may be provided at a location where the first focal distance f1 on the side of the emission surface of the first relay lens 141 and the second focal distance f2 on a side of the incident surface of the second relay lens 143 overlap each other or near the location. The noise removal filter 150 may be, for example, a pin hole. The noise removal filter 150 may be placed at the first focal distance f1 of the first relay lens 141 of the relay optical system 140 and may block light except light of a desired diffraction order, thereby removing noise such as a diffraction pattern or multiplex diffraction due to a pixel structure of the spatial light modulator 120.

As described above, the image of the hologram wavefront formed on the modulating surface of the spatial light modulator 120 may form the imaged SLM 172 by the relay optical system 140. The field lens 170 may focus the imaged SLM 172 in front of the pupils 13 of the user 10 to form the viewing window in front of the pupils 13 of the user 10. The viewing window may be understood as a space for the user 10 to see the hologram image.

The light path converter 180 may be a beam splitter that reflects the diffraction light transferred from the relay optical system 140 and allows the external light Lo to be transmitted therethrough. The light path converter 180 may be disposed where a light beam incident on and transmitted through a first incident surface 180a is reflected from a beam separation film 181 located inside the light path converter 180 and is emitted to an emission surface 180c, and a light beam Lo incident on and transmitted through a second incident surface 180b transmits through the beam separation film 181 and is emitted to the first emission surface 180c.

As an example, the beam separation film 181 may be a half mirror. In this case, the light emitted by the light source unit 110 does not need to be a polarized light.

As another example, when the light emitted by the light source unit 110 has polarization, the beam separation film 181 of the light path converter 180 may be a polarization selective reflection film. If a polarization direction of the light beam incident on the first incident surface 180a is a first polarization direction, and a polarization direction orthogonal to the first polarization direction is a second polarization direction, the beam separation film 181 may have polarization selectivity so that light having the first polarization direction is reflected, and light having the second polarization direction is transmitted. Since the external light Lo has both a first polarization component and a second polarization component, if the beam separation film 181 has the polarization selectivity, only the second polarization component included in the external light Lo incident on the second incident surface 180b may be transmitted through the beam separation film 181 and may reach the pupils 13 of the user's eyes 11.

The first incident surface 180a of the light path converter 180 may be adjacent to the field lens 170. The emission surface 180c of the light path converter 180 may be adjacent to the pupils 13 of the user's eyes 11.

The light path converter 180 may be an example of an optical member that changes at least one of a path of the diffraction light of the hologram image transferred from the relay optical system 140 and a path of the external light Lo and transfers the diffraction light and the external light Lo to the same region (i.e., the pupils 13 of the user's eyes 11).

As described above, the see-through holographic display apparatus 100 according to an exemplary embodiment may be the wearable apparatus worn on the head of the user 10, and thus the housing 190 may have a shape of one-eye glasses that may be a device closely mounted on an eye of the user 10, on a side of a face from an eye to an ear, or may have a shape attached to one of the lenses of glasses.

For example, the housing 190 may include a first housing portion 190A adjacent to an ear, a bent portion 190B, and a second housing portion 190C adjacent to the eye 11. The first housing portion 190A, the bent portion 190B, and the second housing portion 190C may be integrally formed but are not limited thereto. The first housing portion 190A may be provided with, for example, the light source unit 110, the spatial light modulator 120, the light brancher 130, the relay optical system 140, and the noise removal filter 150. The second housing portion 190C may be provided with, for example, the field lens 170 and the light path converter 180. The bent portion 190B may be provided with a reflection member 160 such as a total reflection prism or a mirror that bends a light path in accordance with a shape of the housing 190. The second relay lens 143 of the relay optical system 140 or the noise removal filter 150 may be provided in the second housing portion 190C according to a size of the housing 190 or a focal distance of the relay optical system 140 of the optical system. The second housing portion 190C may include a first window 191 provided at a location facing the eyes 11 of the user 10 and a second window 192 provided at a location opposite to the first window 191 when the see-through holographic display apparatus 100 is worn on the head of the user 10. The first and second windows 191 and 192 may include glass or a transparent plastic material or may be open portions, i.e., not covered by glass or plastic, of the second housing portion 190C. The light path converter 180 may be provided such that the second incident surface 180b is located near the second window 192. According to the layout described above, the external light Lo may be incident on the light path converter 180 through the second window 192 and may reach the eyes 11 of the user 10 through the light path converter 180 and the first window 191. In other words, the user 10 may see the outside scene through the first window 191, the light path converter 180, and the second window 192. According to the layout described above, the light path converter 180 may be provided adjacent to the eyes 11 of the user 10.

FIG. 3 is a diagram of an example of a layout of the field lens 170. For convenience of illustration, FIG. 3 shows diffraction light that is not bent by the beam separation film 181 of the light path converter 180 of FIG. 2. Referring to FIG. 3, the field lens 170 may be provided at a location of the imaged SLM 172 or near the location. If a light modulation surface of the spatial light modulator 120 is provided at a location of the first focal distance f1 of an incident surface side of the first relay lens 141 or near the location, since the imaged SLM 172 is formed at a location where the second focal distance f2 of the emission surface side of the second relay lens 143 or near the location, the field lens 170 may be provided at the location where the second focal distance f2 of the emission surface side of the second relay lens 143 or near the location.

Figure 4:
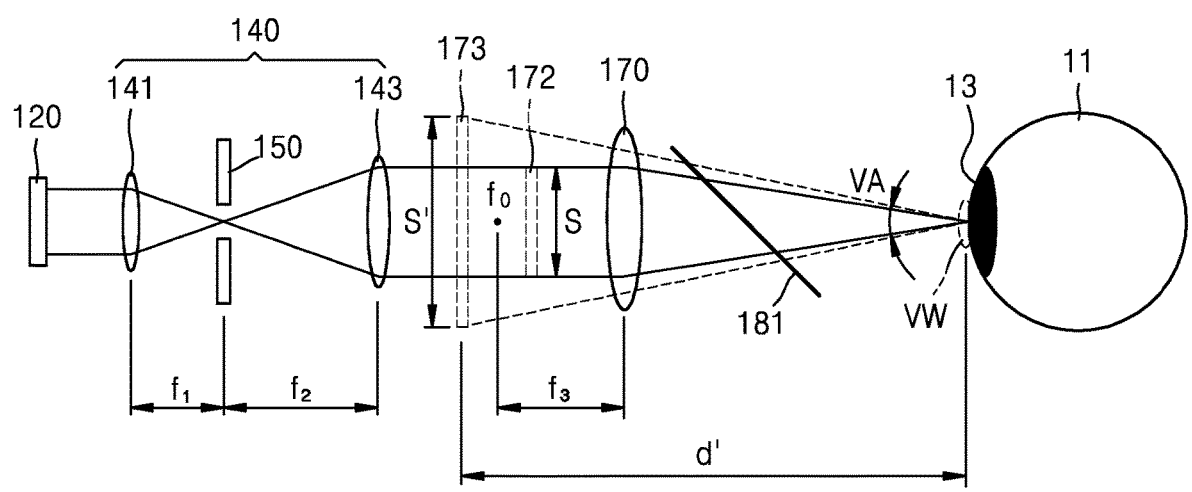
FIG. 4 is a diagram of another example of a layout of a field lens.

FIG. 4 is a diagram of another example of a layout of the field lens 170. For convenience of illustration, FIG. 4 shows diffraction light that is not bent by the beam separation film 181 of the light path converter 180 of FIG. 2. Referring to FIG. 4, the field lens 170 may be provided such that the imaged SLM 172 is placed between a front focus (an object focus) Fo of the field lens 170 and an incident surface 22 of the field lens 170.

The operation of the see-through holographic display apparatus 100 will now be described with reference to FIG. 2. The controller 900 may generate a hologram data signal and provide the hologram data signal to the spatial light modulator 120. The hologram data signal may be a computer-generated hologram (CGH) signal that is computed to reproduce a target hologram image on a space. Color hologram images may be implemented by RGB time-division driving. For example, the controller 900 may sequentially drive red, green, blue light sources of the light source unit 110, transfer the hologram data signal corresponding to each of a red, green, and blue hologram image, and sequentially display the red, green, and blue hologram images, and thus the color hologram images may be displayed.

The spatial light modulator 120 may form a hologram pattern on a surface of the spatial light modulator 120 according to the hologram data signal provided by the controller 900. A principle that the spatial light modulator 120 forms the hologram pattern may be the same as a principle that, for example, a display panel displays an image. For example, the hologram pattern may be displayed on the spatial light modulator 120 as an interference pattern including information regarding the hologram image that is to be reproduced. Then, the light may become diffraction light modulated to have a hologram wavefront on the modulating surface of the spatial light modulator 120 by the hologram pattern formed by the spatial light modulator 120.

The diffraction light generated by the spatial light modulator 120 may form the imaged SLM 172 output by the relay optical system 140.

The spatial light modulator 120 may be configured as an array of a plurality of pixels, and thus the array of the plurality of pixels function as a pixel lattice. Thus, the incident light may be diffracted and interfered by the hologram pattern formed by the spatial light modulator 120 and by the pixel lattice configured as the array of the pixels of the spatial light modulator 120. A part of the incident light might not be diffracted by the hologram pattern of the spatial light modulator 120 and may be transmitted. As a result, a plurality of lattice spots may appear on the pupil plane on which the hologram image is collected as a spot and a VW is placed. The plurality of lattice spots may function as image noise that deteriorates quality of the hologram image and makes it inconvenient to appreciate the hologram image.

The noise removal filter 150 may be placed in the first focal distance f1 of the first relay lens 141 of the relay optical system 140 and may block light other than light of a desired diffraction order, thereby removing noise such as a diffraction pattern or multiplex diffraction due to a pixel structure of the spatial light modulator 120.

The field lens 170 may collimate the imaged SLM 172 to form the VW in front of the pupils 13 of the eyes 11 of the user 10. That is, the hologram wavefront (i.e., the imaged SLM 172) formed by the relay optical system 140 may be diffracted and interfered in the VW, and thus the field lens 170 may enable a 3D hologram image to be seen.

The beam separation film 181 of the light path converter 180 of FIG. 2, as described above, may allow the external light Lo of FIG. 2 to be transmitted, and thus not only the hologram image but also a scene outside the second window 192 of FIG. 2 may be seen in the VW.

As shown in FIG. 3, when the field lens 170 is provided at a location of the imaged SLM 172 or near the location, an image seen by the user through the field lens 170 may be the imaged SLM 172. That is, when the hologram image is reproduced, the user 10 may appreciate the hologram image in a viewing location, i.e., VW, disposed away by a distance d from the imaged SLM 172. The VA of the reproduced hologram image or a field of view (FOV) may be controlled according to a size S of the imaged SLM 172 and a distance d from the imaged SLM 172 to the VW. That is, if the size S of the imaged SLM 172 increases, the VA or the FOV may increase, and, if the size S of the imaged SLM 172 decreases, the VA or the FOV may decrease. The size S of the imaged SLM 172 may be determined according to a size of the spatial light modulator 120 and a magnification or a reduction ratio of the relay optical system 140. If the distance d from the imaged SLM 172 to the VW decreases, the VA or the FOV may increase. The distance d from the imaged SLM 172 to the VW may be determined according to an F value F/# of the field lens 170. As described above, the field lens 170 and the light path converter 180 are provided in contact with the pupils 13 of the user 10, and thus the distance d from the imaged SLM 172 to the VW may decrease, and accordingly the VA or the FOV may increase.

Figure 5:
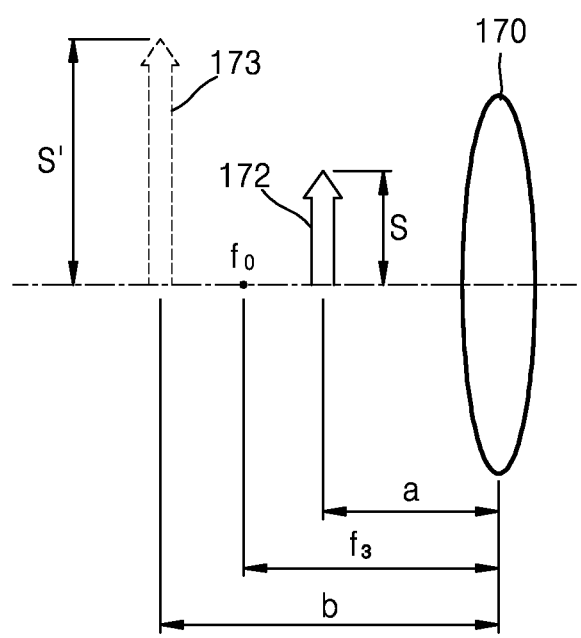
FIG. 5 is a diagram for describing an operation of the layout of the field lens of FIG. 4.

FIG. 5 is a diagram for describing an operation of the layout of the field lens 170 of FIG. 4. When the imaged SLM 172 is placed between the front focus (an object focus) Fo of the field lens 170 and an incident surface of the field lens 170, as shown in FIG. 5, an image seen through the field lens 170 may be an erect virtual imaged SLM 173 formed by the field lens 170. A size S' of the erect virtual imaged SLM 173 may satisfy an equation of a lens with respect to the size S of the imaged SLM 172 below, $$\frac{S'}{S} = \frac{b}{a} = -\left|\frac{f_3}{f_3 - a}\right|$$ [Equation 1]

where a sign of minus "−" denotes a virtual image, a denotes a distance between the imaged SLM 172 and the field lens 170, b denotes a distance between the erect virtual imaged SLM 173 and the field lens 170, and f3 denotes a front focal distance of the field lens 170.

The user 10 may appreciate the hologram image in a viewing location, i.e., VW, disposed away by a distance d' from the erect virtual imaged SLM 173. The VA of the reproduced hologram image or a FOV may be controlled according to the size S' of the erect virtual imaged SLM 173 and the distance d' from the erect virtual imaged SLM 173 to the VW. That is, if the size S' of the erect virtual imaged SLM 173 increases, the VA or the FOV may increase, and, if the size S' of the erect virtual imaged SLM 173 decreases, the VA or the FOV may decrease. The size S' of the erect virtual imaged SLM 173 may be determined according to a location relationship between the imaged SLM 172 and the field lens 170 as shown in Equation 1 above. In more detail, as the front focus Fo of the field lens 170 is provided closer to the imaged SLM 172, the size S' of the erect virtual imaged SLM 173 may increase, and thus the VA or the FOV may increase.

An immersive holographic display apparatus that implements a hologram image by using a complex spatial light modulator may be known as a holographic display apparatus applied to the related art HMD. However, the complex spatial light modulator may need a complicated structure, cause deterioration of resolution, and cause deterioration of the quality of a 2D image when the 2D image is provided. An ultra-high definition complex spatial light modulator may be necessary to minimize an influence of high-order diffraction, and the FOV may be restricted by a size of the complex spatial light modulator. Thus, the complex spatial light modulator having ultra-high definition pixels may have a relatively narrow FOV with respect to the same resolution.

However, the see-through holographic display apparatus 100 of the present exemplary embodiment may generate the hologram image of the size S of the imaged SLM 172 or the size S' of the erect virtual imaged SLM 173 according to the size of the spatial light modulator 120 and also based on a configuration of the optical system (for example, the magnification of the relay optical system 140, the F value F/# of the field lens 170, or a location of the field lens 170, etc., and thus, the VA of the hologram image or the FOV is not mainly defined by the size of the spatial light modulator 120.

An example of RGB time-division driving for implementing the color hologram image is described in the present exemplary embodiment but the exemplary embodiments are not limited thereto. As another example, the light source unit 110 may illuminate white light and use a liquid crystal panel including a color filter as the spatial light modulator 120, thereby implementing the color hologram image according to a space division.

A case where the light source unit 110 provides collimated parallel light is described in an exemplary embodiment. However, the light source unit 110 may include a divergent or convergent light source. In this case, the light source unit 110 may include a lens that diverges or converges light instead of a collimator lens. The field lens 170 may be omitted according to circumstances.

Although the see-through holographic display apparatus 100 is worn on the left eye 11L of the user 10 in FIGS. 1 and 2, the see-through holographic display apparatus 100 may be worn on the right eye 11R of the user 10. The see-through holographic display apparatus 100 worn on the right eye 11R may have a structure that is symmetrical to that of the see-through holographic display apparatus 100 worn on the left eye 11L.

Figure 6:
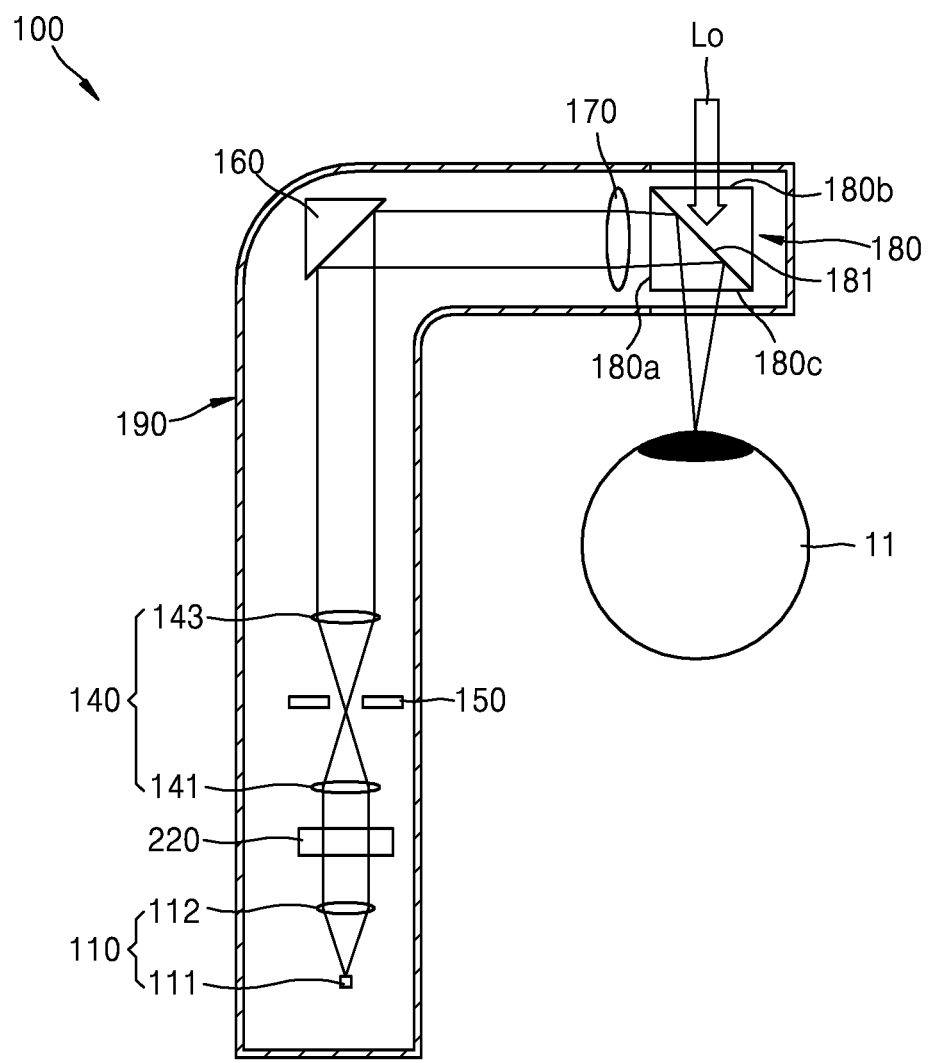
FIG. 6 is a schematic diagram of an optical system of a see-through holographic display apparatus according to an exemplary embodiment.

FIG. 6 is a schematic diagram of an optical system of a see-through holographic display apparatus 100 according to an exemplary embodiment. Referring to FIG. 6, the see-through holographic display apparatus 100 of the present exemplary embodiment may be substantially the same as the see-through holographic display apparatus 100 described with reference to FIGS. 1 through 5. The see-through holographic display apparatus 100 of FIG. 6 includes a transmissive spatial light modulator 220. The transmissive light spatial modulator 220 may include, for example, a light modulator using a liquid crystal device (LCD) or a semiconductor light modulator based on a compound semiconductor such as GaAs. Light emitted from the light source unit 110 may be diffracted and modulated through the transmissive light spatial modulator 220. Diffraction light that passes through the transmissive light spatial modulator 220 may be focused in front of the pupils 13 of the eyes 11 of the user 10 through the relay optical system 140, the field lens 170, and the light path converter 180 to form the VW.

Figure 7:
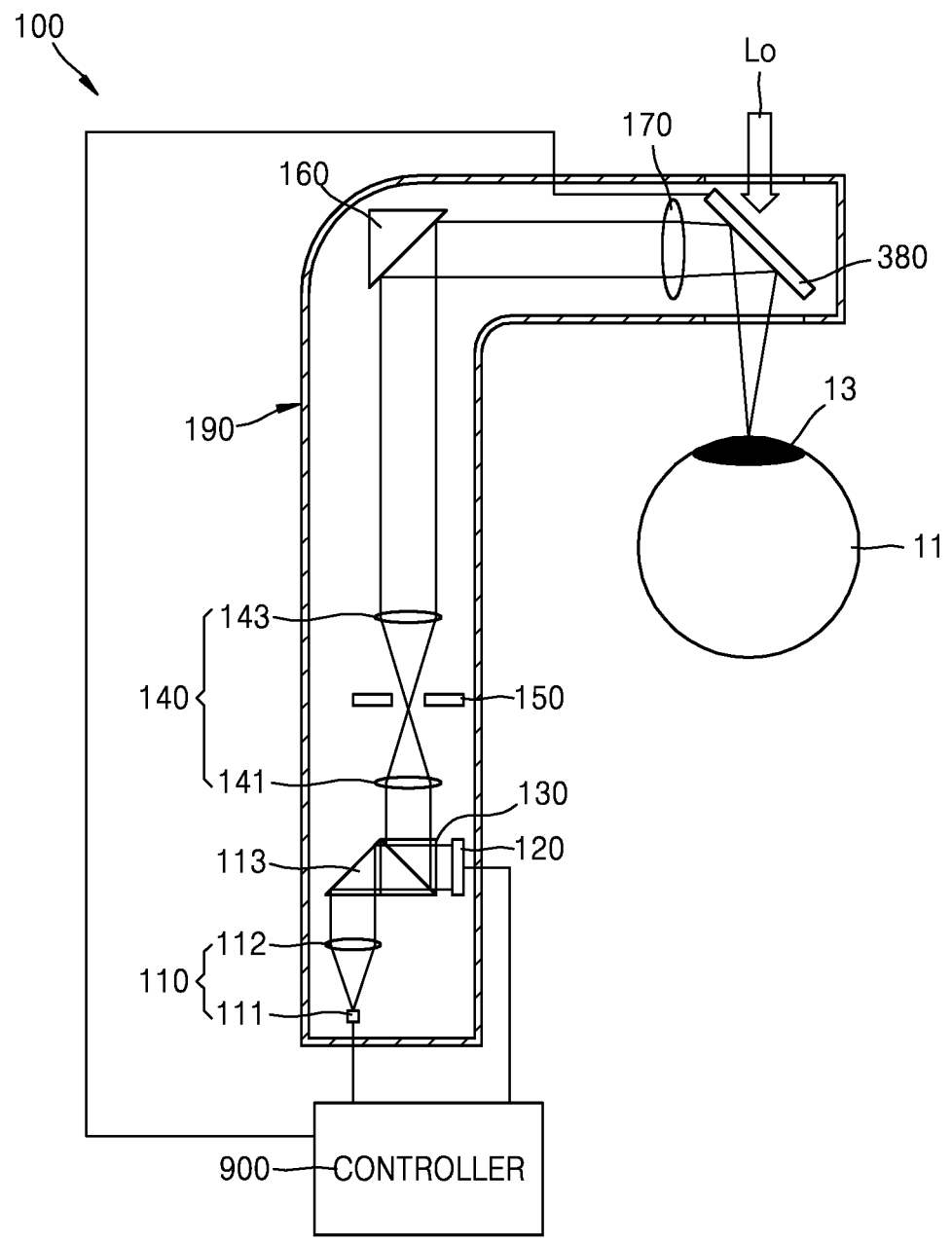
FIG. 7 is a schematic diagram of an optical system of a see-through holographic display apparatus according to an exemplary embodiment.

FIG. 7 is a schematic diagram of an optical system of a see-through holographic display apparatus 100 according to an exemplary embodiment. Referring to FIG. 7, the see-through holographic display apparatus 100 of the present exemplary embodiment may be substantially the same as the see-through holographic display apparatus 100 described with reference to FIGS. 1 through 5. The see-through holographic display apparatus 100 includes an active reflector 380 as a light path converter. The active reflector 380 may be an optical component that may actively adjust reflection and transmittance under the control of a controller 900. For example, a transmittance regulating device using liquid crystal (LC), the active reflector 380 may include an electro-chromic device, etc., along with a mirror or a half mirror. Reflection coating that may increase an amount of light toward the pupils 13 of the user 10 or a thin film having other additional functions may be additionally provided on a beam separation film of the active reflector 380. The active reflector 380 may be employed as the light path converter, and thus the controller 900 may adjust an amount of light incident from the outside to the pupils 13 in a case where it is not easy to view a hologram image due to an extremely bright external environment.

Figure 8:
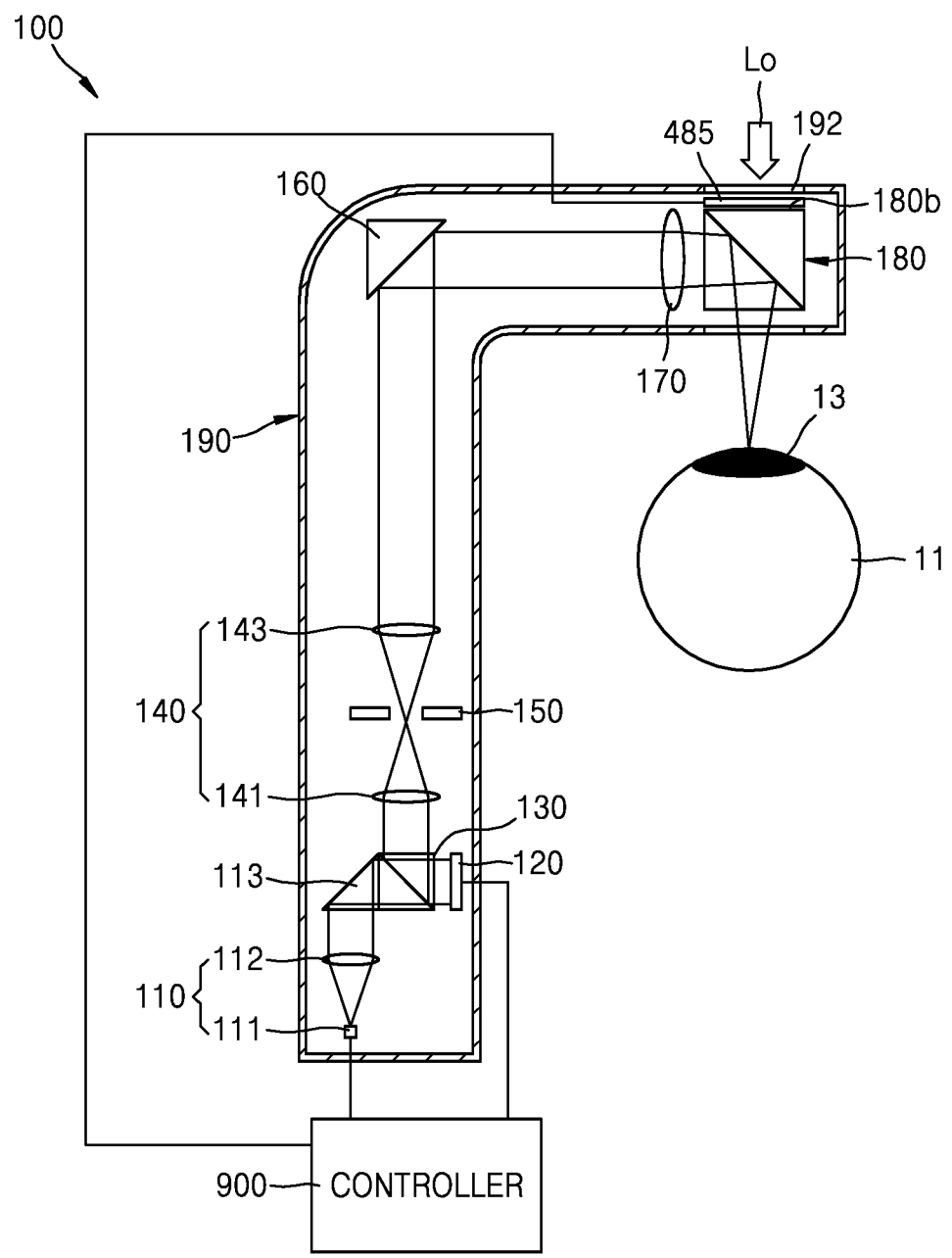
FIG. 8 is a schematic diagram of an optical system of a see-through holographic display apparatus according to an exemplary embodiment.

FIG. 8 is a schematic diagram of an optical system of a see-through holographic display apparatus 100 according to an exemplary embodiment. Referring to FIG. 8, the see-through holographic display apparatus 100 of the present exemplary embodiment may include a light path converter 180 such as a beam splitter described with reference to FIGS. 1 through 5 and a separate transmittance regulating device 485 provided on a second incident surface 180*b* of the light path converter 180. The transmittance regulating device 485 may be separately employed, and thus a controller 900 may adjust an amount of the external light Lo incident from the outside to the pupils 13 through the second window 192 in a case where it is not easy to view a hologram image due to an extremely bright external environment.

Figure 9:
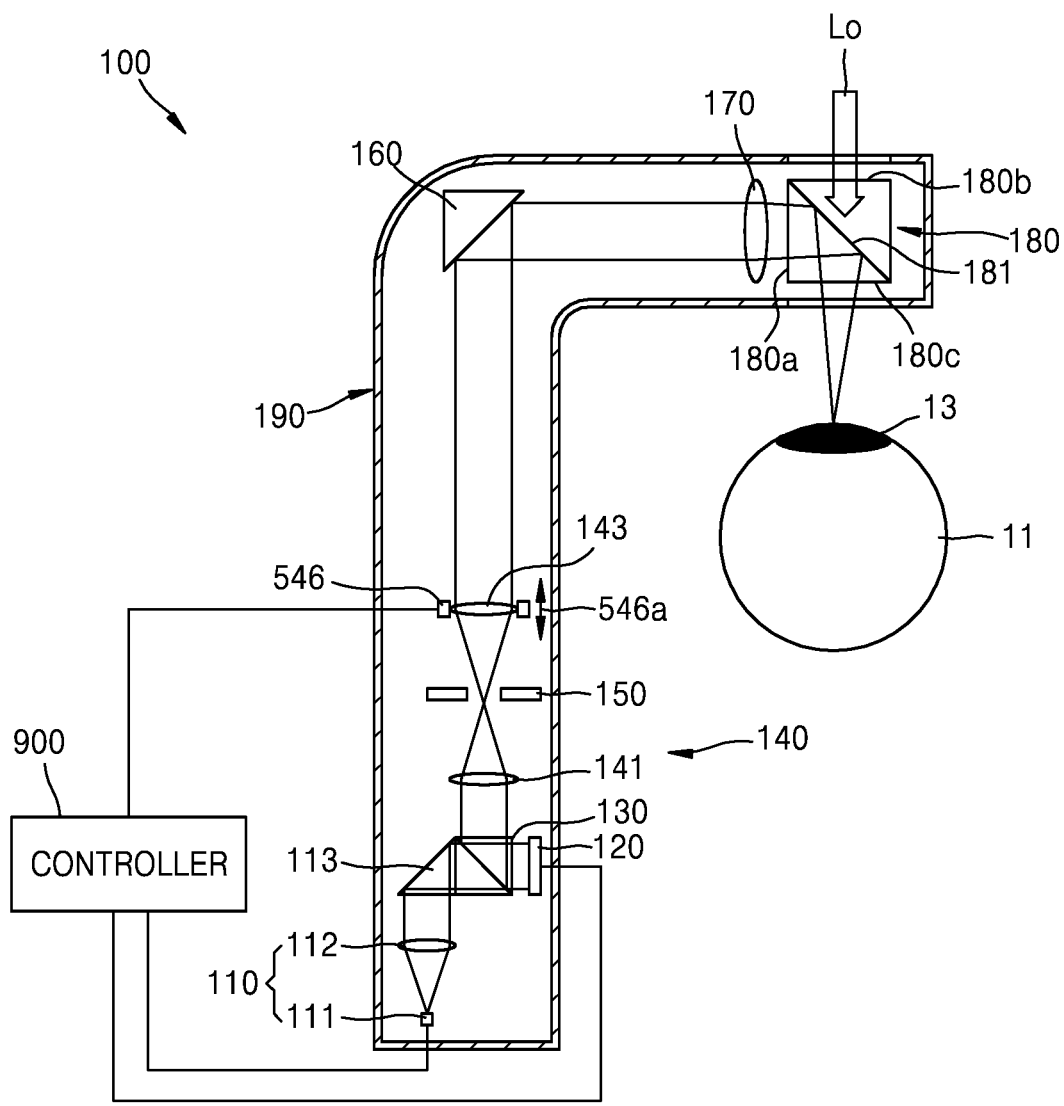
FIG. 9 is a schematic diagram of an optical system of a see-through holographic display apparatus according to an exemplary embodiment.
Figure 10:
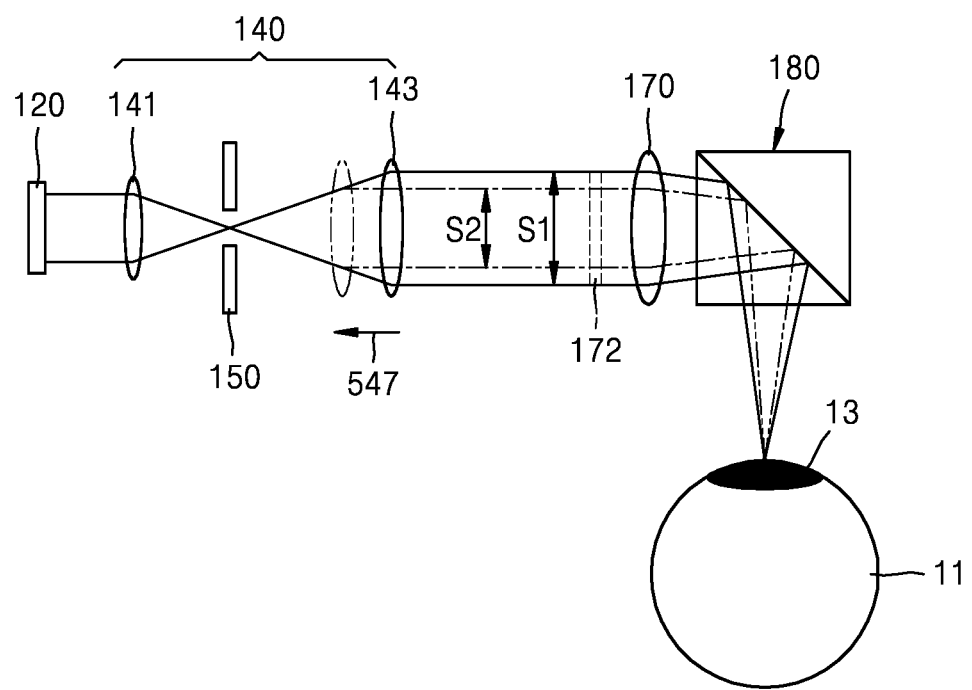
FIG. 10 is a diagram for describing an operation of the see-through holographic display apparatus of FIG. 9.

FIG. 9 is a schematic diagram of an optical system of a see-through holographic display apparatus 100 according to an exemplary embodiment. FIG. 10 is a diagram for describing an operation of the see-through holographic display apparatus 100 of FIG. 9.

Referring to FIG. 9, the see-through holographic display apparatus 100 of the present exemplary embodiment may be substantially the same as the see-through holographic display apparatus 100 described with reference to FIGS. 1 through 5. The see-through holographic display apparatus 100 further includes a moving lens holder 546 that may move a second relay lens 143 of a relay optical system 140 in an optical axis direction 546*a*. The moving lens holder 546 may include a motor (not shown) to move the second relay lens 143 in the optical axis direction 546*a* under the control of a controller 900. As another example, the moving lens holder 546 may manually move the second relay lens 143 in the optical axis direction 546*a*. If the second relay lens 143 is moved in the optical axis direction 546*a*, a size of the imaged SLM 172 formed by the relay optical system 140 may be adjusted or a location of the imaged SLM 172 may be moved as shown in FIG. 10.

In more detail, diffraction light formed by the spatial light modulator 120 via a first relay lens 141 of the relay optical system 140 may be diverged after being focused at a focal location on a side of an emission surface of the first relay lens 141. Like the see-through holographic display apparatus 100 described with reference to FIGS. 1 through 5, if the second relay lens 143 is at a location (hereinafter, referred to as an original location) where a focal location on a side of an incident surface of the second relay lens 143 is identical to the focal location on a side of an emission surface of the first relay lens 141, the size of the imaged SLM 172 may be S1. However, if the second relay lens 143 is moved in a direction 147 closer to the first relay lens 141 from the original location, the size of the imaged SLM 172 may be reduced to S2. As a result, a user may see the imaged SLM 172 of a small size (S2), and thus the VA or the FOV may be reduced. On the contrary, if the second relay lens 143 is moved in a direction away from the first relay lens 141 from the original location, since the size of the imaged SLM 172 may be larger than S1, the user may see the imaged SLM 172 of a large size, and thus the VA or the FOV may increase. As described above, the see-through holographic display apparatus 100 of the present exemplary embodiment may adjust the FOV, as described with reference to FIG. 3, by moving a lens location of the relay optical system 140.

As described above, if the second relay lens 143 is moved in the optical axis direction 546a, since the location of the imaged SLM 172 may also be moved, as described with reference to FIG. 4, the location of the imaged SLM 172 may be adjusted between the front focus Fo of the field lens 170 and an incident surface of the field lens 170, and thus the size (S' of equation 1) of the erect virtual imaged SLM 173 may be adjusted, thereby regulating the FOV.

If the FOV increases, since a pixels per inch (PPI) of a hologram image is reduced, image quality may deteriorate, and, if the FOV is reduced, since the PPI of the hologram image increases, the image quality may be improved.

Figure 11:
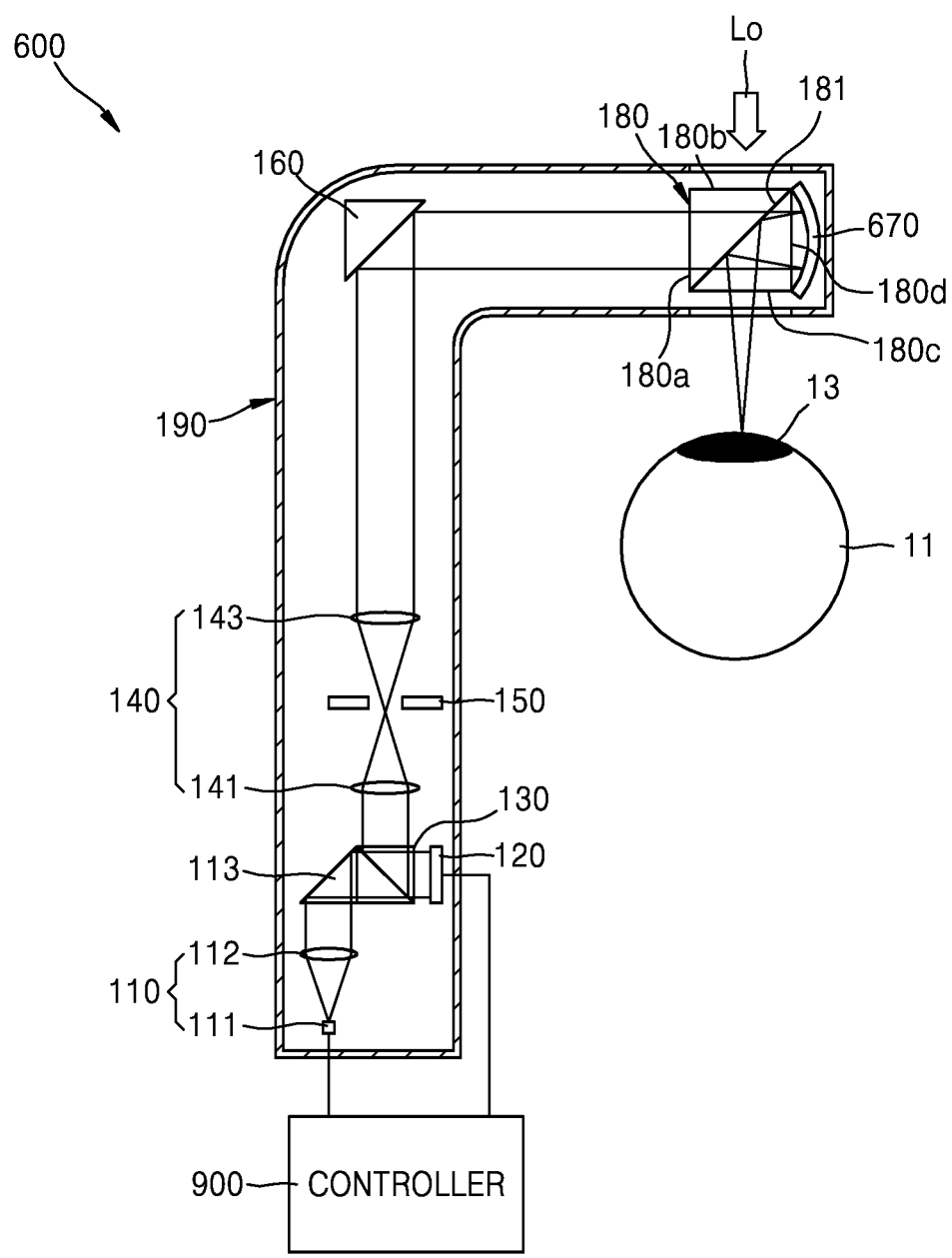
FIG. 11 is a schematic diagram of an optical system of a see-through holographic display apparatus according to an exemplary embodiment.

FIG. 11 is a schematic diagram of an optical system of a see-through holographic display apparatus 100 according to an exemplary embodiment. Referring to FIG. 11, the see-through holographic display apparatus 100 of the present exemplary embodiment may be substantially the same as the see-through holographic display apparatus 100 described with reference to FIGS. 1 through 5. The see-through holographic display apparatus 100 of FIG. 11 includes a field optical element including a field reflection mirror 670. A light path converter 180 may be a beam splitter. A beam separation film 181 of the light path converter 180, as shown in FIG. 11, may be provided that diffraction light incident on and transmitted through a first incident surface 180a and the external light Lo incident on and transmitted through a second incident surface 180b may be transmitted toward an emission surface 180c, and light incident on and transmitted through a third surface 180d may be reflected toward the emission surface 180c. The third surface 180d may be opposite to the first incident surface 180a. The field reflection mirror 670 may be provided adjacent to the third surface 180d of the light path converter 180.

According to the layout described above, the diffraction light via the relay optical system 140 may be incident on the first incident surface 180a of the light path converter 180 and may be transmitted to the third surface 180d via the beam separation film 181. At least portion of the diffraction light transmitted by the third surface 180d may be reflected by the field reflection mirror 670, incident on the third surface 180d of the light path converter 180 again, reflected from the beam separation film 181, and incident on and emitted through the emission surface 180c, and thus the diffraction light may reach the pupils 13 of the eyes 11 of the user 10. The diffraction light may be incident on the field reflection mirror 670 as a collimated parallel light and may be focused by the field reflection mirror 670 to form the VW at the pupils 13. The external light Lo may be incident on the second incident surface 180b of the light path converter 180 and transmitted to the emission surface 180c via the beam separation film 181, and thus the external light Lo may reach the pupils 13 of the user 10.

Figure 12:
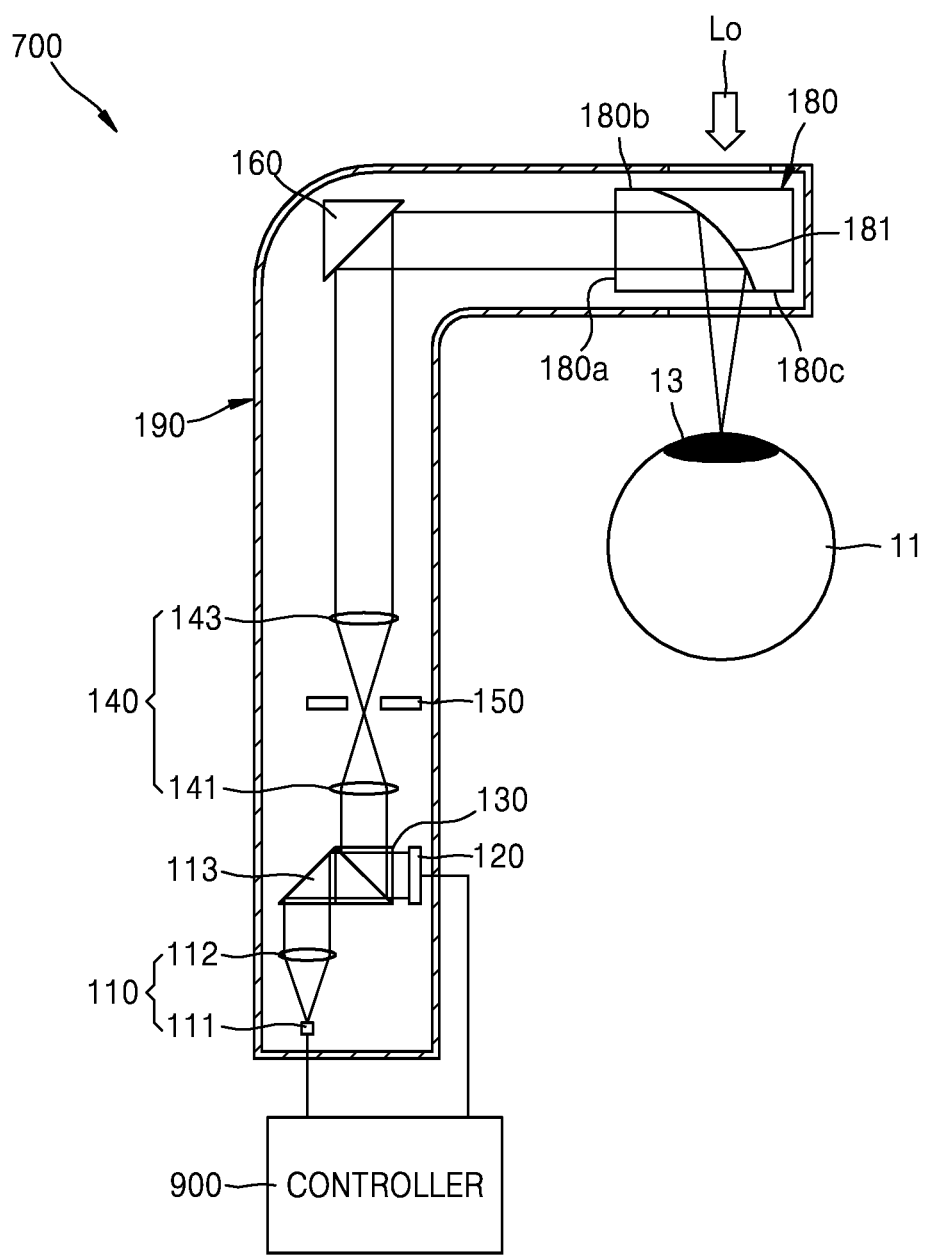
FIG. 12 is a schematic diagram of an optical system of a see-through holographic display apparatus according to an exemplary embodiment.

FIG. 12 is a schematic diagram of an optical system of a see-through holographic display apparatus 100 according to an exemplary embodiment. Referring to FIG. 12, the see-through holographic display apparatus 100 of the present exemplary embodiment is substantially the same as the see-through holographic display apparatus 100 described with reference to FIGS. 1 through 5. The see-through holographic display apparatus 100 of FIG. 12 includes a light path converter 180 having a curved surface beam separation film 181.

The light path converter 180 may be a beam splitter including the beam separation film 181 having a concave curved surface with respect to a first incident surface 180a. The light path converter 180 may have two portions split by the beam separation film 181 that are joined with respect to the beam separation film 181 by a boundary. The two portions of the light path converter 181 may have substantially the same refractive index.

The beam separation film 181 of the light path converter 180 may be a half mirror. In this case, light emitted by a light source unit 110 does not need to be a polarized light.

As another example, when the light emitted by the light source unit 110 has polarization, the beam separation film 181 of the light path converter 180 may be a polarization selective reflection film. For example, the beam separation film 181 may have polarization selectivity so that the light of a first polarization incident on a first incident surface 180a (i.e., polarization light emitted from the light source unit 110) is reflected by the beam separation film 181, and the light of a second polarization is transmitted. Since the external light Lo has both a first polarization component and a second polarization component orthogonal to a first polarization direction, if the beam separation film 181 has the polarization selectivity, only the second polarization component included in the external light Lo incident on a second incident surface 180b may be transmitted through the beam separation film 181 and may reach the pupils 13 of the user's eyes 11.

The curved surface of the beam separation film 181 may be designed such that a light beam incident on the first incident surface 180a is reflected and focused in the beam separation film 181 to form the VW in front of the pupils 13 of the user's eyes 11. Focusing of the light beam by the beam separation film 181 may replace a function of the field lens 170 described with reference to FIGS. 1 through 10 or the field reflection mirror 670 described with reference to FIG. 11. Thus, the light path converter 180 may be provided at a location corresponding to a location of the field lens 170 described above. For example, the light path converter 180 may be provided such that the beam separation film 181 is placed near the image plane (refer to 172 of FIG. 3) on which a hologram image transferred from the relay optical system 140 is imaged.

Since the two portions of the light path converter 180 joined with respect to the beam separation film 181 by a boundary have substantially the same refractive index, when the external light Lo passes through the beam separation film 181, no refraction occurs. In other words, the external light Lo passes through the beam separation film 181 without a refraction, and a user may see an outside scene without a distortion.

Figure 13:
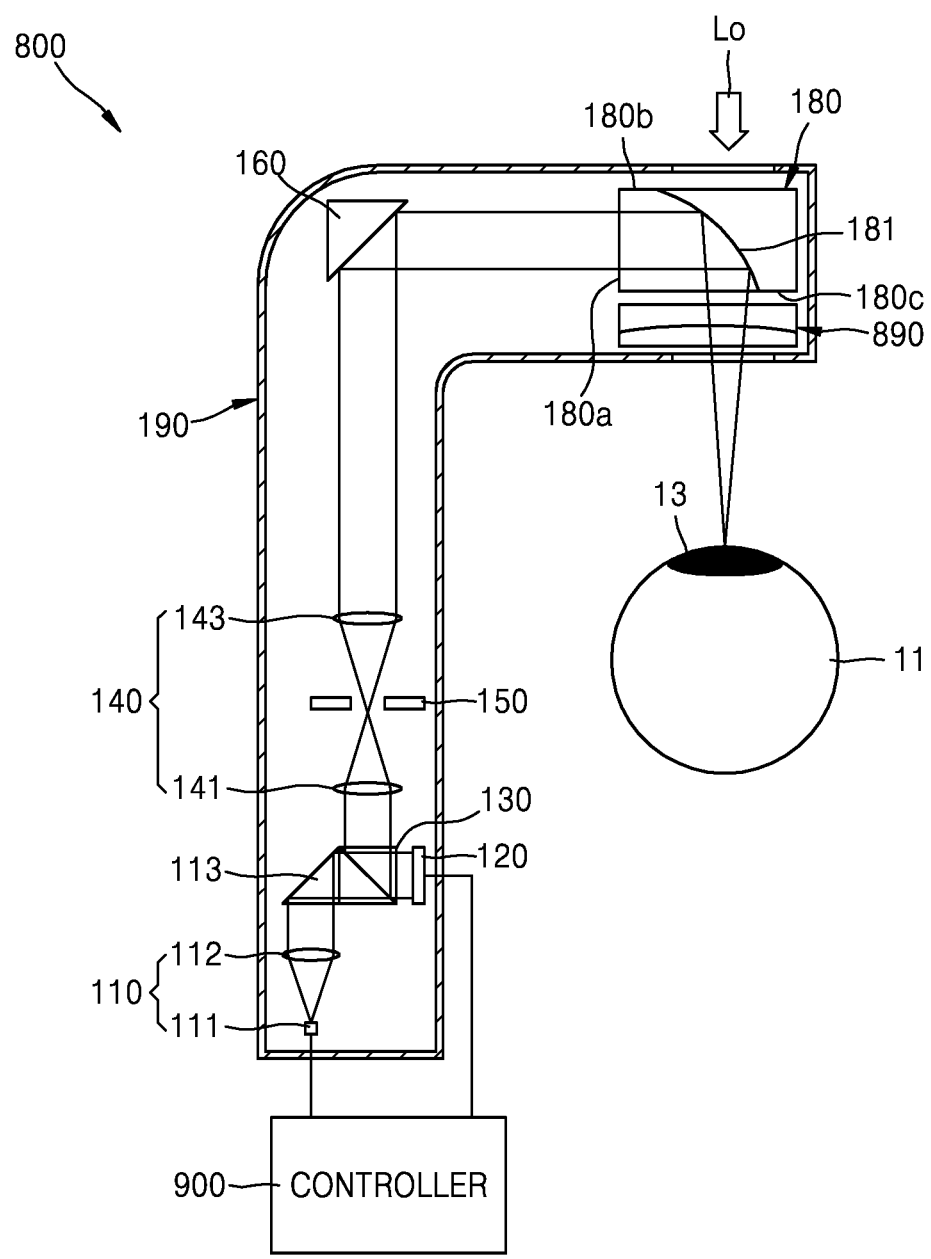
FIG. 13 is a schematic diagram of an optical system of a see-through holographic display apparatus according to an exemplary embodiment.

FIG. 13 is a schematic diagram of an optical system of a see-through holographic display apparatus 100 according to an exemplary embodiment.

Referring to FIG. 13, the optical system of the see-through holographic display apparatus 100 of the present exemplary embodiment is substantially the same as the optical system of the see-through holographic display apparatus 100 described with reference to FIG. 7. The see-through holographic display apparatus 100 further includes a light beam selective optical element 890, and thus differences will be mainly described below.

The light source unit 110 may provide polarization light. As described with reference to FIG. 2, when the light source unit 110 emits polarization light, the light brancher 130 may be a polarization beam splitter, and a polarization converting member such as a ¼ polarization plate (not shown) may be further provided between the light brancher 130 and the spatial light modulator 120. A light path converter 180 may have polarization selectivity and include a beam separation film 181 formed in a predetermined curved surface. As described with reference to FIG. 12, the beam separation film 181 may have polarization selectivity so that light of a first polarization incident on a first incident surface 180a (i.e., polarization light emitted from the light source unit 110) is reflected, and light of a second polarization is transmitted. Since the external light Lo has both a first polarization component and a second polarization component orthogonal to a first polarization direction, only the second polarization component included in the external light Lo may be transmitted through the beam separation film 181 and reach the pupils 13 of the user's eyes 11. As will be described below, the light beam selective optical element 890 may have positive (+) refractive power only with respect to the light of the first polarization and may have no refractive power with respect to the light of the second polarization. Thus, the curved surface of the beam separation film 181 may be designed in consideration of the refractive power of the light beam selective optical element 890.

Figure 14:
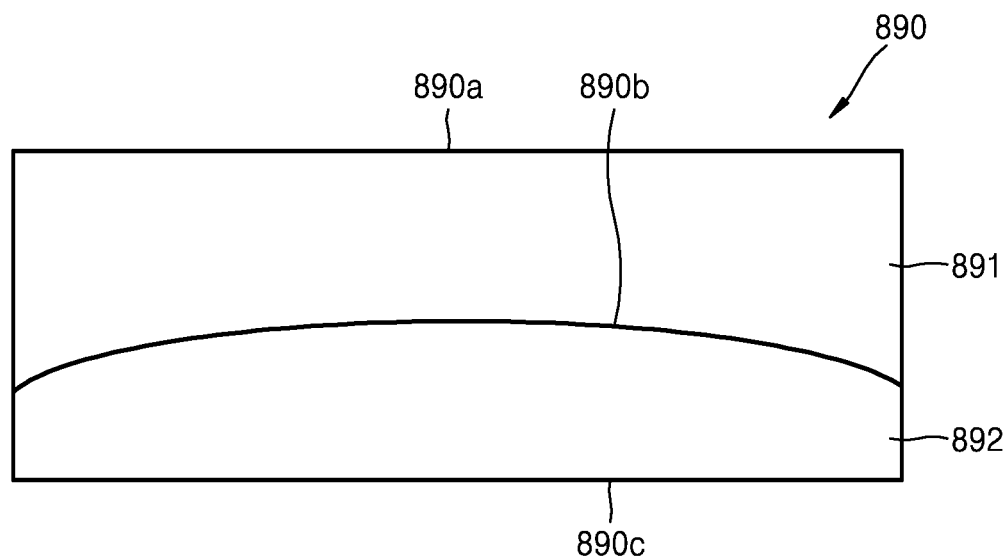
FIG. 14 is a diagram of an example of a light beam selective optical element according to an exemplary embodiment.

FIG. 14 is a diagram of an example of the light beam selective optical element 890. The light beam selective optical element 890 of FIG. 14 is a polarization dependent lens of different refractive indexes with respect to light of a first polarization and light of a second polarization. Referring to FIG. 14, the light beam selective optical element 890 may be a cemented lens in which a first lens 891 and a second lens 892 are cemented. The first lens 891 may be an isotropic lens including, for example, glass or an isotropic polymer material. The second lens 892 may be an anisotropic lens including an anisotropic polymer material of a different refractive index according to a polarization direction. The second lens 892 including the anisotropic polymer material may have a refractive index different from the first lens 891 with respect to light of a first polarization and may have substantially the same refractive index as the first lens 891 with respect to light of a second polarization. An incident surface 890a of the first lens 891 of the light beam selective optical element 890 and an emission surface 890c of the second lens 892 of the light beam selective optical element 890 may be flat surfaces. A boundary surface 890b between the first lens 891 and the second lens 892 may be a curved surface having a predetermined curvature. The curved surface of the boundary surface 890b may be designed that a light beam of the first polarization incident on the incident surface 890a of the light beam selective optical element 890 is focused to form a VW in front of the pupils 13 of the user's eyes 11.

An operation of the see-through holographic display apparatus 100 of the present exemplary embodiment will now be described in brief.

Light having polarization emitted by the light source unit 110 may have predetermined hologram image information and may be diffracted via the spatial light modulator 130 and, via the relay optical system 140 and the noise removal filter 150, may be incident on the first incident surface 180a of the light path converter 180 as diffraction light of a first polarization. The light path converter 180 may be configured where the light of the first polarization may be reflected in the beam separation film 181, focused by a curvature of the beam separation film 181, and emitted through an emission surface 180c. The light of the first polarization emitted from the light path converter 180 may be focused in the light beam selective optical element 890 to form the VW in front of the pupils 13 of the user's eyes 11, and thus a user may see a hologram image.

The external light Lo may be incident on a second incident surface 180b of the light path converter 180. Only light of a second polarization perpendicular to the first polarization included in the external light Lo may pass through the beam separation film 181 of the light path converter 180 and may be emitted through the emission surface 180c. The external light Lo of the second polarization emitted from the light path converter 180 may pass through the light beam selective optical element 890 without a refraction, and thus the user may see an outside scene without a distortion.

In the present exemplary embodiment, the light path converter 180 and the light beam selective optical element 890 may be designed with respect to the light of the first polarization by distributing refractive power, and thus an optics design may be further free in view of a degree of freedom, and a VA may sufficiently increase. For example, when the light beam selective optical element 890 sufficiently controls the refractive power, the beam separation film 181 of the light path converter 180 may be formed as a flat surface.

Figure 15A:
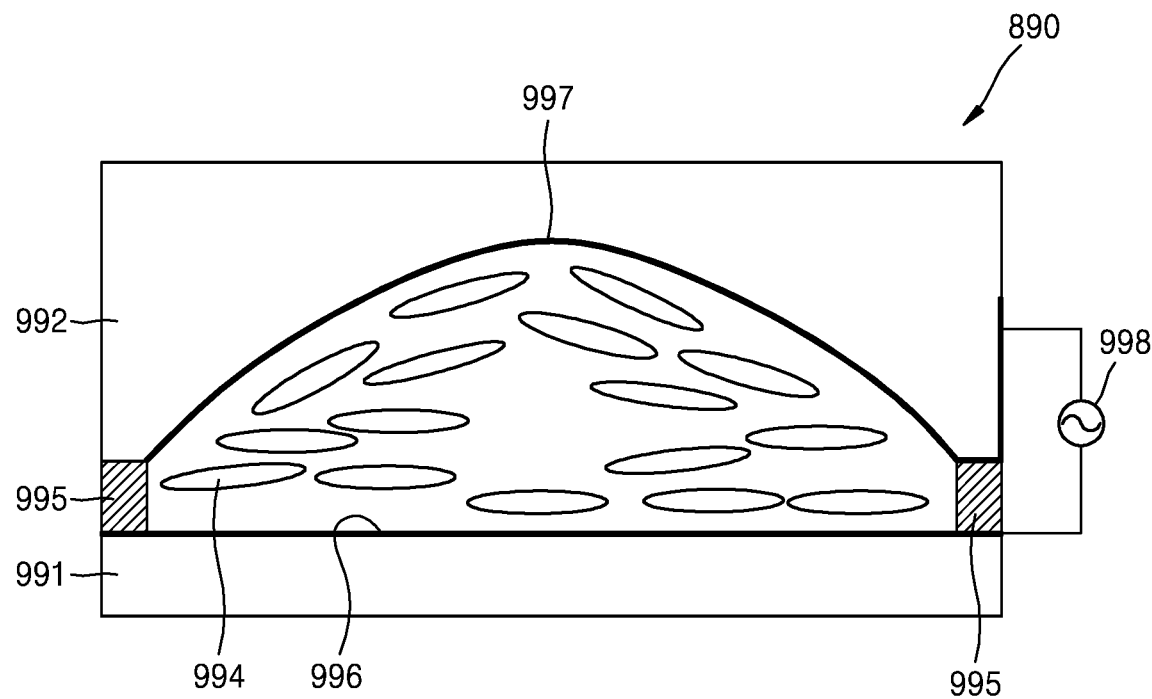
FIGS. 15A, 15B, and 15C are diagrams of examples of light beam selective optical element according to an exemplary embodiment.
Figure 15B:
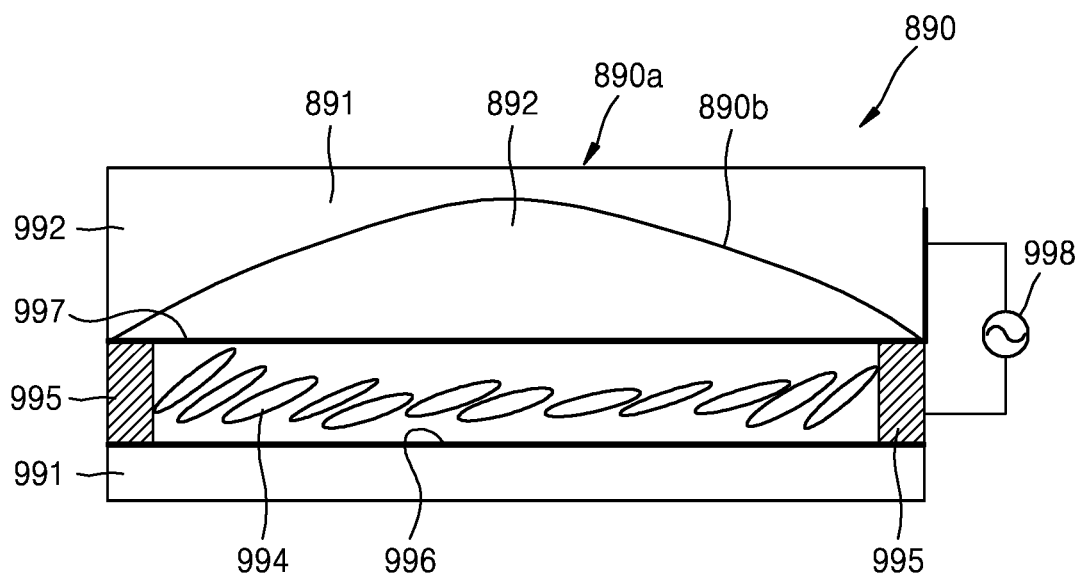
Figure 15C:
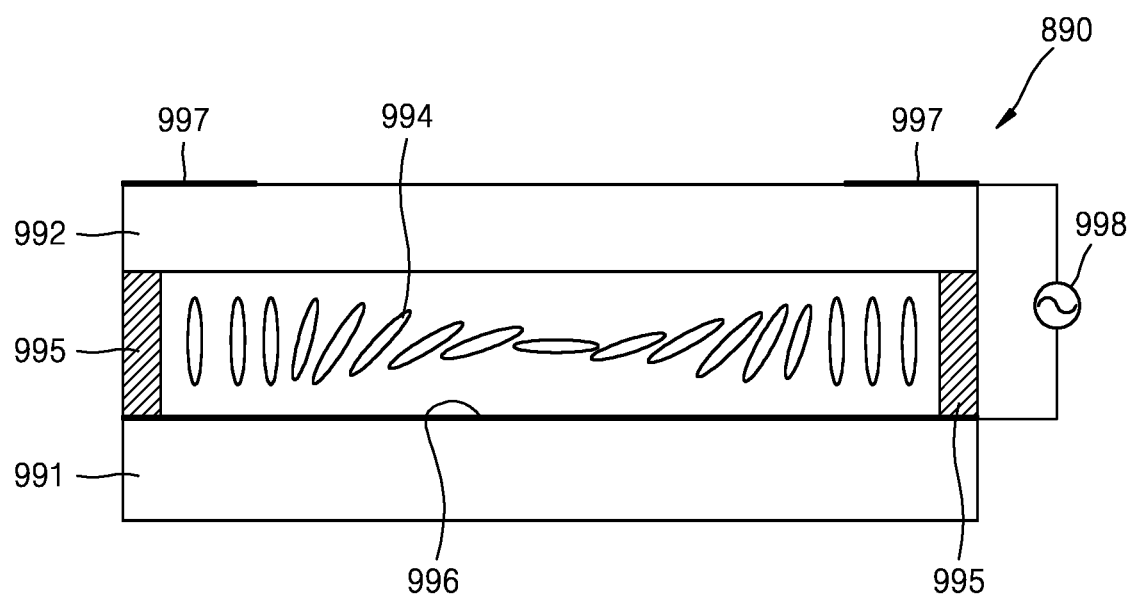

FIGS. 15A through 15C are diagrams of examples of light beam selective optical element.

Referring to FIG. 15A, the light beam selective optical element 890 may include first and second transparent substrate layers 991 and 992 that are opposite to each other and a liquid crystal layer 994 interposed between the first and second transparent substrate layers 991 and 992. At least one surface between opposite surfaces of the first and second transparent substrate layers 991 and 992 may be formed in a curved surface such that the light beam selective optical element 890 may have predetermined refractive power according to an orientation of the liquid crystal layer 994. First and second electrodes 996 and 997 may be respectively provided in the first and second transparent substrate layers 991 and 992. A power supply 998 may apply voltages to the first and second electrodes 996 and 997. Liquid crystals of the liquid crystal layer 994 may be aligned by the applied voltages. Reference numeral 995 denotes a barrier sealing the liquid crystal layer 994. A refractive index and a polarization characteristic of the liquid crystal layer 994 may be changed according to an alignment of the liquid crystals, and thus the light beam selective optical element 890 of the present exemplary embodiment may be an active lens. As an example, while no voltage is applied to the liquid crystal layer 994, light of a first polarization or light of a second polarization may transmit through the liquid crystal layer 994 as they are, and thus a user may see both a hologram image and an outside scene. While a voltage is applied to the liquid crystal layer 994, only the light of the first polarization may be focused after transmitting through the liquid crystal layer 994, and thus the user may see only the hologram image. As another example, while the certain voltage is applied to the liquid crystal layer 994, the light of the second polarization may transmit through the liquid crystal layer 994, only the light of the second polarization may transmit through the liquid crystal layer 994, and while no voltage is applied to the liquid crystal layer 994, both the light of the first polarization and the light of the second polarization may transmit through the liquid crystal layer 994 as they are, and thus while the certain voltage is applied to the liquid crystal layer 994, the user may see both the hologram image and the outside scene, and while the voltage is applied to the liquid crystal layer 994, and the user may see only the outside scene.

Although an inside surface (i.e. a surface on which the second electrode 997 is provided) of the second transparent substrate layer 992 is formed as the curved surface in FIG. 15A, the first transparent substrate layer 991 may be formed to have the curved surface. The first and second electrodes 996 and 997 may be respectively provided on the opposite surfaces of the first and second transparent substrate layers 991 and 992, but an exemplary embodiment is not limited thereto.

FIG. 15B shows an example of the light beam selective optical element 890. Referring to FIG. 15B, the light beam selective optical element 890 may include first and second transparent substrate layers 991 and 992 that are opposite to each other and a liquid crystal layer 994 interposed between the first and second transparent substrate layers 991 and 992. First and second electrodes 996 and 997 may be respectively provided in the first and second transparent substrate layers 991 and 992. A power supply 998 may apply voltages to the first and second electrodes 996 and 997. Liquid crystals of the liquid crystal layer 994 may be aligned by the applied voltages. A polarization characteristic of the liquid crystal layer 994 may be changed according to an application of a voltage. The liquid crystal layer 994 may be sealed by a barrier 995.

At least one of the first and second transparent substrate layers 991 and 992 may be a cemented lens. As an example, as shown in FIG. 15B, the second transparent substrate layer 992 may be formed by cementing a first lens 891 and a second lens 892 that have different refractive indexes. The second transparent substrate layer 992 may have a flat panel shape as a whole. A cemented surface between the first lens 891 and the second lens 892 may be convexly formed with respect to the incident surface 890a such that the second transparent substrate layer 992 may have positive (+) refractive power. A shape of the cemented surface may be changed according to refractive indexes of the first lens 891 and the second lens 892. Like the light beam selective optical element 890 described with reference to FIG. 14 above, the first lens 891 may include an isotropic material, and the second lens 892 may include an anisotropic material such that the second transparent substrate layer 992 may have different refractive indexes with respect to light of a first polarization (i.e. diffraction light) and light of a second polarization (i.e. external light).

In the present exemplary embodiment, the second transparent substrate layer 992 may control refractive power and the light beam selective optical element 890 may only select polarization.

FIG. 15C shows an example of the light beam selective optical element 890. Referring to FIG. 15C, the light beam selective optical element 890 may include first and second transparent substrate layers 991 and 992 that are opposite to each other and a liquid crystal layer 994 interposed between the first and second transparent substrate layers 991 and 992. First and second electrodes 996 and 997 may be respectively provided in the first and second transparent substrate layers 991 and 992. The first electrode 996 may be provided on an entire surface of the first transparent substrate layer 991, whereas the second electrode 997 may be provided on a part of the second transparent substrate layer 992 (for example, a circumference or both sides of the second transparent substrate layer 992 as shown in FIG. 15C). A power supply 998 may apply voltages to the first and second electrodes 996 and 997. Liquid crystals of the liquid crystal layer 994 may be aligned by the applied voltages. The liquid crystal layer 994 may be sealed by a barrier 995.

Since a location of the first electrode 996 is different from a location of the second electrode 997, an electronic field applied to the liquid crystal layer 994 may be non-uniform. For example, when the second electrode 997 is provided in the circumference or both sides of the second transparent substrate layer 992, an electronic field of an edge side of the second electrode 997 may have a fringing field shape. Thus, if a shape of the second electrode 997 and a voltage applied thereto are appropriately selected, the liquid crystal layer 994 may have positive (=) refractive power by the non-uniform electronic field applied to the liquid crystal layer 994. That is, while no voltage is applied to the liquid crystal layer 994, light of a first polarization or light of a second polarization may transmit through the liquid crystal layer 994 as they are, and thus a user may see both a hologram image and an outside scene. While a voltage is applied to the liquid crystal layer 994, only the light of the first polarization may be focused after transmitting through the liquid crystal layer 994, and thus the user may see only the hologram image.

Figure 16:
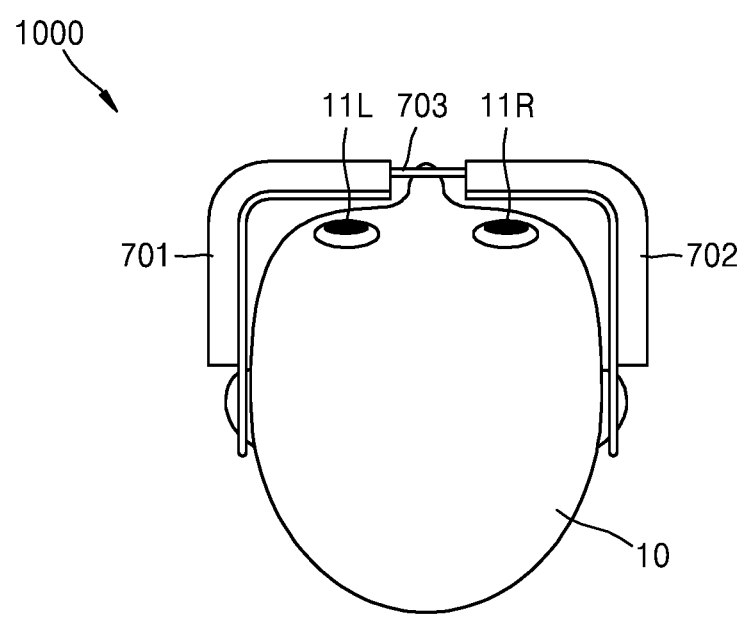
FIG. 16 is a schematic plan view of an example of an HMD apparatus worn by a user according to an exemplary embodiment.
Figure 17:
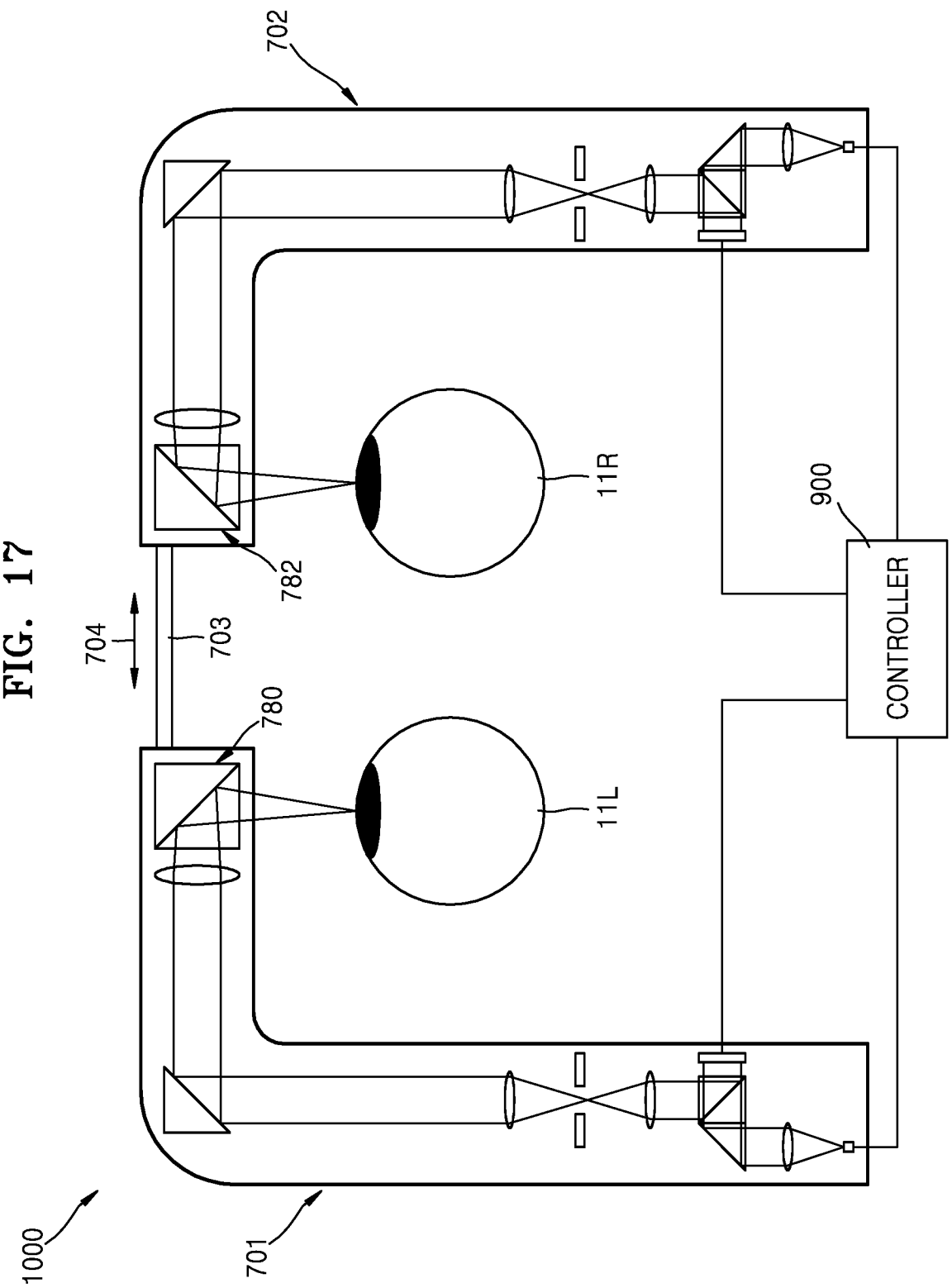
FIG. 17 is a schematic diagram of an optical system of the HMD apparatus of FIG. 16.

FIG. 16 is a schematic plan view of an example of an HMD apparatus 1000 which includes a see-through holographic display apparatus 100 worn by a user according to an exemplary embodiment. FIG. 17 is a schematic diagram of an optical system of the HMD apparatus 1000 of FIG. 16.

Referring to FIG. 16, the HMD apparatus of the present exemplary embodiment may be an apparatus worn on the head of the user 10 such as glasses or goggles or attached onto the glasses or the goggles.

The HMD apparatus 1000 may include a see-through holographic display apparatus 100 including a left eye see-through display apparatus 701, a right eye see-through display apparatus 702, and a frame 703 connecting the left eye see-through display apparatus 701 and the right eye see-through display apparatus 702. Each of the left eye see-through display apparatus 701 and the right eye see-through display apparatus 702 may include one of the see-through holographic display apparatuses described with reference to FIGS. 1 through 15. When HMD apparatus 1000 is worn on the head of the user 10, a light path converter 780 of the left eye see-through display apparatus 701 may be provided adjacent to the left eye 11L of the user 10, and a light path converter 782 of the right eye see-through display apparatus 702 may be provided adjacent to the right eye 11R of the user 10. The left eye see-through display apparatus 701 and the right eye see-through display apparatus 702 may respectively display a left eye hologram image and a right eye hologram image. Since the left eye see-through display apparatus 701 and the right eye see-through display apparatus 702 are see-through display apparatuses, the HMD apparatus 1000 of the present exemplary embodiment may be a see-through display apparatus seeing the left and right eye hologram images and scenes of the outside.

A controller 900 controlling optical systems of the left eye see-through display apparatus 701 and the right eye see-through display apparatus 702 may be provided inside or outside of a housing of one of the left eye see-through display apparatus 701 and the right eye see-through display apparatus 702.

Locations of pupils of different users may slightly differ. Thus, an element regulating a location of the viewing window VW formed by each of the left eye see-through display apparatus 701 and the right eye see-through display apparatus 702 may be needed so that the VW is appropriately positioned at the pupils of different users. The frame 703 may move at least one of the left eye see-through display apparatus 701 and the right eye see-through display apparatus 702 in a left or right direction 704 to reduce or increase a space between the left eye see-through display apparatus 701 and the right eye see-through display apparatus 702, thereby fixing the left eye see-through display apparatus 701 and the right eye see-through display apparatus 702. Such a fixing apparatus of the frame 703 may use a well-known method. The HMD apparatus 1000 of the present exemplary embodiment may include separately the optical system of the left eye see-through display apparatus 701 and the optical system of the right eye see-through display apparatus 702, thereby easily regulating the distance between the left eye see-through display apparatus 701 and the right eye see-through display apparatus 702.

A see-through holographic display apparatus according to the exemplary embodiments may enable the user to simultaneously see a hologram image and the outside view or selectively see one of the hologram image and the outside view.

A see-through holographic display apparatus according to the exemplary embodiments may adjust a size of a field of view.

A see-through holographic display apparatus according to the exemplary embodiments may be applied to a personal see-through HMD.

A see-through holographic display apparatus according to the exemplary embodiments may implement an optical system that implements a hologram through an amplitude modulation method to an HMD.

When a see-through holographic display apparatus according to the exemplary embodiments is applied to a binocular mounted display, since a left optical system and a right optical system are completely separated, one or both of the left optical system and the right optical system are moved in accordance with a distance between a left pupil and a right pupil of a user, thereby regulating a distance between the left pupil and the right pupil.

The described-above exemplary embodiments and advantages are merely exemplary and are not to be construed as limiting. The present teaching can be readily applied to other types of apparatuses. The description of exemplary embodiments is intended to be illustrative, and not to limit the scope of the claims, and many alternatives, modifications, and variations will be apparent to those skilled in the art.

What is claimed is:

1. A see-through holographic display apparatus comprising:
    a light source configured to emit light;
    a spatial light modulator configured to diffract the emitted light and generate a hologram image by modulating the emitted light;
    a relay optical system configured to expand or reduce the generated hologram image, and transfer the hologram image which has been expanded or reduced;
    a noise removal filter configured to remove noise from diffraction light of the transferred hologram image;
    a field optical element which has an incident surface on which the diffraction light of the transferred hologram image is incident; and
    a light path converter, on which the diffraction light, having passed the field optical element, and an external light are incident and which is configured to change a path of the diffraction light, and transfer at least one from among the diffraction light and the external light to a same region,
    wherein the relay optical system comprises:
        at least one optical element, and
        a moving lens holder which is coupled to the at least one optical element and moves the at least one optical element to change a distance between the at least one optical element and the field optical element so as to adjust a size of the hologram image transferred from the relay optical system,
    wherein the light path converter comprises a beam splitter comprising:
        a first surface which transmits the diffraction light of the transferred hologram image that is incident on the first surface,
        a second surface which transmits the external light incident thereon,
        a third surface opposite to the second surface,
        a fourth surface opposite to the first surface, and
        a beam separation film provided inside the beam splitter,
    wherein the field optical element comprises a reflection mirror having a concave surface facing the fourth surface of the beam splitter, and
    wherein the beam separation film is configured to transmit at least a part of the diffraction light, which is transmitted through the first surface, to the fourth surface, reflect at least a part of the diffraction light, which is reflected by the reflection mirror and transmitted through the fourth surface, to the third surface, and transmit at least a part of the external light, which is transmitted through the second surface, to the third surface.

2. The see-through holographic display apparatus of claim 1, further comprising:
    a collimator configured to convert the light emitted by the light source into a collimated light.

3. The see-through holographic display apparatus of claim 1, wherein the spatial light modulator comprises at least one of an amplitude spatial light modulator, a phase spatial light modulator, or a complex spatial light modulator.

4. The see-through holographic display apparatus of claim 1, wherein the relay optical system comprises:
    a first optical element having a first incident surface on which the hologram image modulated by the spatial light modulator is incident, a first emission surface, and a first focus; and a second optical element having a second focus and a second incident surface facing the first emission surface,
   wherein a location of the second focus on a side of the second incident surface is near a location of the first focus on a side of the first emission surface.

5. The see-through holographic display apparatus of claim 4, wherein a first focal distance of the first optical element is different from a second focal distance of the second optical element.

6. The see-through holographic display apparatus of claim 4, wherein the noise removal filter is provided near the first focus on the side of the first emission surface of the first optical element.

7. The see-through holographic display apparatus of claim 1, wherein the noise removal filter comprises a pin hole.

8. The see-through holographic display apparatus of claim 1, wherein the field optical element is configured to focus the incident diffraction light.

9. The see-through holographic display apparatus of claim 8, wherein the field optical element is provided near an image plane on which the transferred hologram image is imaged.

10. The see-through holographic display apparatus of claim 8, wherein the field optical element is arranged such that an image plane on which the transferred hologram image is imaged is provided between a focus location of the field optical element on a side of the incident surface of the field optical element and the incident surface of the field optical element.

11. The see-through holographic display apparatus of claim 10, wherein the field optical element is arranged such that the image plane is reimaged as an erect virtual image.

12. The see-through holographic display apparatus of claim 8, wherein the field optical element is provided adjacent to the light path converter.

13. The see-through holographic display apparatus of claim 8, wherein the light path converter comprises a beam splitter comprising:
   a first surface which transmits the diffraction light of the transferred hologram image incident thereon;
   a second surface which transmits the external light incident thereon;
   a third surface opposite to the second surface; and
   a beam separation film provided inside the beam splitter,
   wherein the beam separation film is configured to reflect at least a part of the diffraction light, which is transmitted through the first surface, to the third surface, and transmit at least a part of the external light, which is transmitted through the second surface, to the third surface, and
   the field optical element comprises a field lens provided adjacent to the first surface of the beam splitter.

14. The see-through holographic display apparatus of claim 8, wherein the light path converter comprises a half mirror, and
   the field optical element is provided between the relay optical system and the light path converter and adjacent to the light path converter.

15. The see-through holographic display apparatus of claim 1, wherein the light path converter comprises a beam splitter comprising:
   a first surface which transmits the diffraction light of the transferred hologram image that is incident on the first surface;
   a second surface which transmits the external light incident thereon;
   a third surface opposite to the second surface; and
   a beam separation film provided inside the beam splitter and having a concave surface facing the first surface,
   wherein the concave surface of the beam separation film is configured to reflect and focus at least a part of the diffraction light, which is transmitted through the first surface, onto the third surface, and transmit at least a part of the external light, which is transmitted through the second surface, to the third surface.

16. The see-through holographic display apparatus of claim 15, wherein the light path converter is arranged such that the beam separation film is provided near an image plane on which the transferred hologram image is imaged.

17. The see-through holographic display apparatus of claim 15, wherein the beam separation film includes a polarization selective reflection film.

18. The see-through holographic display apparatus of claim 15, further comprising:
   a light beam selective optical element configured to focus the diffraction light and transmit the external light therethrough.

19. The see-through holographic display apparatus of claim 18, wherein the light beam selective optical element is a cemented lens including an isotropic lens and an anisotropic lens, and
   a refractive power of the cemented lens with respect to the diffraction light has a positive value and a total refractive power of the cemented lens with respect to the external light has a value of 0.

20. The see-through holographic display apparatus of claim 18, wherein the light beam selective optical element comprises:
   a first transparent substrate layer and a second transparent substrate layer that are opposite to each other; and
   a liquid crystal layer which is interposed between the first transparent substrate layer and the second transparent substrate layer, and is controlled to have a selective polarization characteristic by selectively applying voltage to electrodes provided on at least a portion of a surface of the first transparent substrate layer and the second transparent substrate layer, respectively.

21. The see-through holographic display apparatus of claim 18, wherein the light beam selective optical element comprises:
   a first transparent substrate layer and a second transparent substrate layer that are opposite to each other; and
   a liquid crystal layer interposed between the first transparent substrate layer and the second transparent substrate layer and includes an active liquid lens which is controlled to have a selective refractive power by selectively applying voltages to electrodes provided on at least a portion of a surface of the first transparent substrate layer and the second transparent substrate layer, respectively.

22. The see-through holographic display apparatus of claim 1, wherein the light path converter comprises an active reflector configured to adjust a transmission amount of the external light.

23. The see-through holographic display apparatus of claim 22, wherein the active reflector comprises one of a liquid crystal filter and an electro-chromic device.

24. The see-through holographic display apparatus of claim 1, wherein the light path converter is provided near pupils of a user.

25. The see-through holographic display apparatus of claim 1, wherein the see-through holographic display apparatus is installed in a head mounted housing worn on a head of a user, for at least one from among a left eye and a right eye.

26. A head mounted display (HMD) apparatus configured to display a hologram image, the HMD apparatus comprising:
   a left eye see-through holographic display apparatus;
   a right eye see-through holographic display apparatus; and
   a frame which connects the left eye see-through holographic display apparatus and the right eye see-through holographic display apparatus,
   wherein each of the left eye see-through holographic display apparatus and the right eye see-through holographic display apparatus comprises:
      a light source configured to provide light;
      a spatial light modulator configured to diffract the light and generate the hologram image;
      a relay optical system configured to expand or reduce the generated hologram image, and transfer the hologram image which has been expanded or reduced;
      a noise removal filter configured to remove noise from diffraction light of the transferred hologram image;
      a field optical element which has an incident surface on which the diffraction light of the transferred hologram image is incident; and
      a light path converter, on which the diffraction light having passed the field optical element and an external light are incident and which is configured to change a path of the diffraction light, and transfer at least one from among the diffraction light and the external light to a same region,
   wherein the relay optical system comprises:
      at least one optical element, and
      a moving lens holder which is coupled to the least one optical element and moves the least one optical element to change a distance between the relay optical system and the least one optical element, so as to adjust a size of the hologram image transferred from the relay optical system,
   wherein the light path converter comprises a beam splitter comprising:
      a first surface which transmits the diffraction light of the transferred hologram image that is incident on the first surface,
      a second surface which transmits the external light incident thereon,
      a third surface opposite to the second surface,
      a fourth surface opposite to the first surface, and
      a beam separation film provided inside the beam splitter,
   wherein the field optical element comprises a reflection mirror having a concave surface facing the fourth surface of the beam splitter, and
   wherein the beam separation film is configured to transmit at least a part of the diffraction light, which is transmitted through the first surface, to the fourth surface, reflect at least a part of the diffraction light, which is reflected by the reflection mirror and transmitted through the fourth surface, to the third surface, and transmit at least a part of the external light, which is transmitted through the second surface, to the third surface.

27. The HMD apparatus of claim 26, wherein the HMD apparatus is worn on a head of a user,
   the light path converter of the left eye see-through holographic display apparatus is provided adjacent to a left eye of the user, and
   the light path converter of the right eye see-through holographic display apparatus is provided adjacent to a right eye of the user.

28. The HMD apparatus of claim 27, wherein a distance between the light path converter of the left eye see-through holographic display apparatus and the light path converter of the right eye see-through holographic display apparatus is adjustable.

* * * * *